US007739608B2

(12) United States Patent
Fujishita

(10) Patent No.: US 7,739,608 B2
(45) Date of Patent: Jun. 15, 2010

(54) STORAGE MEDIUM STORING INSTALLATION PACKAGE FOR INSTALLING APPLICATION PROGRAM ON COMPUTER

(75) Inventor: Masahiro Fujishita, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 425 days.

(21) Appl. No.: 11/697,592

(22) Filed: Apr. 6, 2007

(65) Prior Publication Data

US 2007/0283345 A1    Dec. 6, 2007

(30) Foreign Application Priority Data

Apr. 10, 2006   (JP) ............................. 2006-107722

(51) Int. Cl.
G06F 3/00 (2006.01)
G06F 9/445 (2006.01)

(52) U.S. Cl. ..................... 715/744; 715/700; 715/765; 717/174

(58) Field of Classification Search .................. 715/744, 715/781, 700; 717/174, 175
See application file for complete search history.

(56) References Cited

U.S. PATENT DOCUMENTS 6,029,198 A * 2/2000 Iizuka ........................ 709/223

| 7,002,702 | B1 * | 2/2006 | Machida | 358/1.15 |
| 7,123,212 | B2 * | 10/2006 | Acharya et al. | 345/2.1 |
| 2001/0030597 | A1 * | 10/2001 | Inoue et al. | 340/3.7 |
| 2005/0228517 | A1 * | 10/2005 | Tomita | 700/87 |
| 2006/0004743 | A1 * | 1/2006 | Murao et al. | 707/4 |
| 2006/0041655 | A1 * | 2/2006 | Holloway et al. | 709/223 |
| 2007/0078925 | A1 * | 4/2007 | Neil et al. | 709/201 |

FOREIGN PATENT DOCUMENTS

JP    H05-089134 A    4/1993

* cited by examiner

Primary Examiner—X. L Bautista
(74) Attorney, Agent, or Firm—Baker Botts L.L.P.

(57) ABSTRACT

An application program is configured to display a screen in a display format when the application program is installed on a computer. Each of a plurality of screen display data files includes screen-display data for displaying a screen in respective ones of a plurality of display formats. A screen configuration data file includes display-format data specifying one of the plurality of display formats. An installer installs on the computer the application program, the plurality of screen display data files, and the screen configuration data file. The application program determines the display format based on the screen configuration data file when the application program is started on the computer, and displays the screen in the display format by using one of the plurality of screen display data files that corresponds to the display format specified by the screen configuration data file.

11 Claims, 29 Drawing Sheets

FIG.30
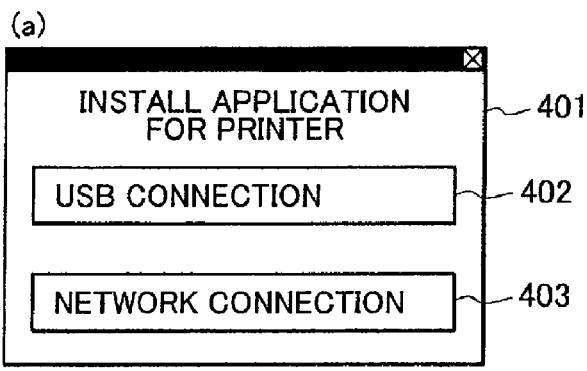
(a)
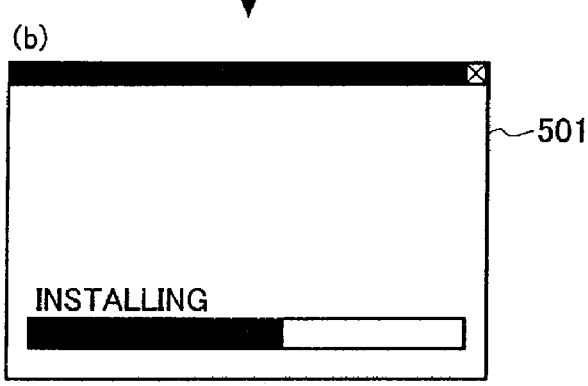
(b)
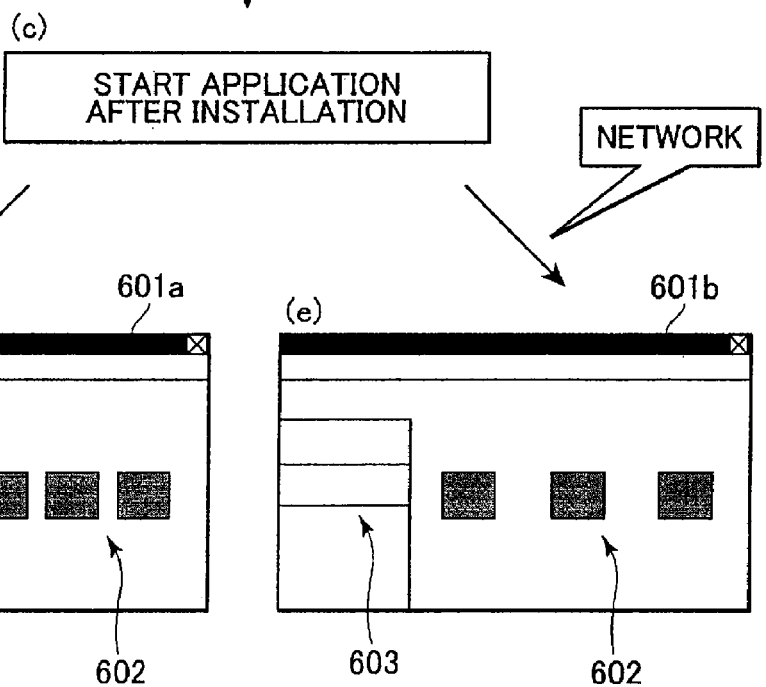

STORAGE MEDIUM STORING INSTALLATION PACKAGE FOR INSTALLING APPLICATION PROGRAM ON COMPUTER

CROSS REFERENCE TO RELATED APPLICATIONS

This application claims priority from Japanese Patent Application No. 2006-107722 filed Apr. 10, 2006. The entire content of the priority application is incorporated herein by reference.

TECHNICAL FIELD

The invention relates to a storage medium storing an installation package including an application program that functions on a computer and an installer for installing the application program on the computer.

BACKGROUND

In application programs developed by software providers and well known in the art, a startup screen, user interface (hereinafter abbreviated as "UI") window, and other screens have different display formats according to the sales target or end-user (such as a company or individual), even when the program provides the same functions. The display format of screens required for application programs may differ according to the end-user because of the different required functions and degree of user-friendliness in a business office or an individual's home or the different network environment to which the computer is connected, for example. Therefore, the software provider must provide an application program having a display format preset to suit the needs of the end-user. The software provider supplies this type of application program to the user in the form of an installation package (where "package" denotes a combination of programs and files in this specification), including an installer for installing the application program on the computer.

In order to provide this installation package to different users, the software provider has created application programs having screens with different formats according to the end-user, as described above, and has supplied the application programs to different users as separate software packages. Consequently, the software provider must develop, test, and revise a plurality of application programs for a plurality of end-users, despite the application programs having the same functions and differing only in the display format, thereby requiring much effort and expense in creating the software.

However, Japanese Patent Application Publication No. 5-89134 discloses a technique for displaying a desired startup screen by presetting the startup screen according to the user's wishes.

SUMMARY

Hence, the technology disclosed in Japanese Patent Application Publication No. 5-89134 allows the user to set a desired display format for screens in the same application. However, this publication does not relate to a technology enabling the software provider to provide an application program preset to display a screen display format suited to the end-user. Therefore, when first started up with this conventional technology, the application program does not necessarily operate with the startup screen and UI window suited to the end-user. When viewing windows of an application that is operating with a startup screen and UI window not suited to the end-user, the user may doubt that the correct application program was installed or may doubt the operability or completeness of the program. Consequently, the user may lose trust in the software provider.

To prevent the user from forming a negative impression about their product, the software provider must create a plurality of application programs targeting each of the end-users, despite the program having the same functions and only differing in the screen display format, as described above. This process requires much effort and expense.

In view of the foregoing, it is an object of the invention to provide a technology that, rather than requiring a plurality of application programs with different screen display formats to be created for each end-user, provides a plurality of display formats in the same application program and selects a display format preset by the software provider from among the plurality of display formats for displaying the screens.

In order to attain the above and other objects, the invention provides a storage medium storing an installation package for installing an application program on a computer. The installation package includes an application program, a plurality of screen display data files, a screen configuration data file, and an installer. The application program is configured to display a screen in a display format when the application program is installed on a computer. Each of the plurality of screen display data files includes screen-display data for displaying a screen in respective ones of a plurality of display formats. The screen configuration data file includes display-format data specifying one of the plurality of display formats. The installer installs on the computer the application program, the plurality of screen display data files, and the screen configuration data file. The application program determines the display format based on the screen configuration data file when the application program is started on the computer, and displays the screen in the display format by using one of the plurality of screen display data files that corresponds to the display format specified by the screen configuration data file.

According to another aspect, the invention also provides a storage medium storing an installation package for installing an application program on a computer. The installation package includes an application program, a plurality of screen display data files, a screen configuration data file, a settings recording tool, and an installer. The application program is configured to display a screen in a display format when the application program is installed on a computer. Each of the plurality of screen display data files includes screen-display data for displaying a screen in respective ones of a plurality of display formats. The screen configuration data file includes display-format data specifying one of the plurality of display formats. The settings recording tool records the display-format data in a settings database managed by an operating system of the computer. The installer installs on the computer the application program and the plurality of screen display data files, and uses the settings recording tool to record the display-format data in the settings database. The application program determines the display format based on the display-format data recorded in the settings database when the application program is started on the computer, and displays the screen in the display format by using one of the plurality of screen display data files that corresponds to the display format specified by the display-format data.

BRIEF DESCRIPTION OF THE DRAWINGS

Embodiments in accordance with the invention will be described in detail with reference to the following figures wherein:

FIG. 30 is an explanatory diagram showing sample screens displayed on the personal computer in the second modification, wherein part (a) shows a UI window that prompts the user to specify a connection method for the targeted printer, part (b) shows a UI window showing that an installation process is progressing, part (c) shows that the application is started after the application has been installed on the personal computer, part (d) shows a UI window in which a USB connection is specified as the connection method for the printer, and part (e) shows a UI window in which a network connection is specified as the connection method for the printer.

DETAILED DESCRIPTION

A storage medium storing an installation package according to embodiments of the invention will be described while referring to the accompanying drawings.

Figure 1:
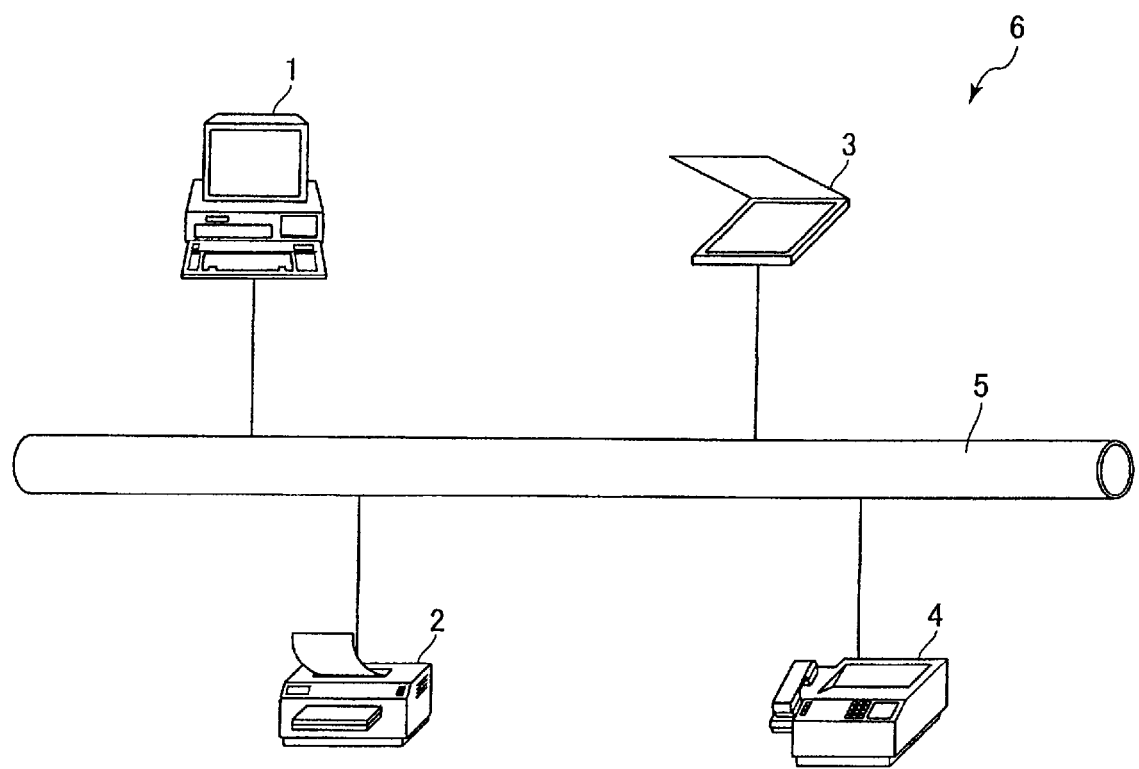
FIG. 1 is an explanatory diagram showing the overall network environment of a system including a personal computer connected to a printer, scanner, and multifunction device via a network.

FIG. 1 is a block diagram showing the overall network environment of a system 6. The system 6 includes a personal computer 1 connected to peripheral devices including a printer 2, scanner 3, and multifunction device 4 via a network 5, such as a local area network (LAN). The personal computer 1 may also be directly connected to the peripheral devices by serial cables, USB cables, or the like, rather than through the network 5.

By installing an application program with functions for controlling the peripheral devices on the personal computer 1, the personal computer 1 can execute various processes on the printer 2, scanner 3, and multifunction device 4, such as a printing process and an image-scanning process.

The printer 2 is a peripheral device having a printer function for printing images or text on recording paper based on print data including image data and text data that are transferred from the personal computer 1.

The scanner 3 is a peripheral device having a scanner function for scanning images recorded on an original and transferring the scanned data to the personal computer 1 as digital data.

The multifunction device 4 is a multipurpose device integrally provided with the printer and scanner functions described above, as well as a copier function, facsimile function, and the like.

Figure 2:
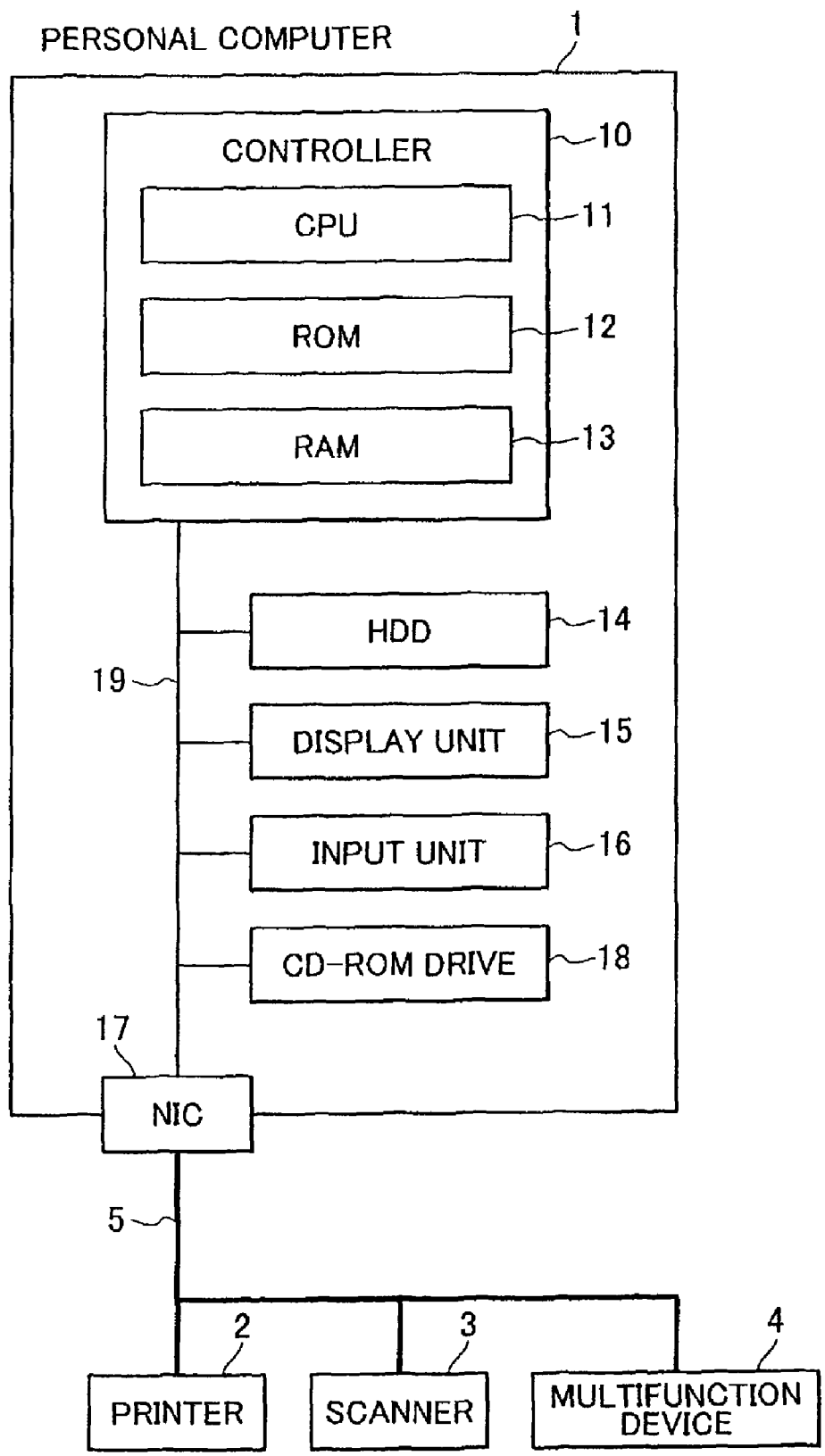
FIG. 2 is a block diagram showing the overall structure of the personal computer.

FIG. 2 is a block diagram showing the overall structure of the personal computer 1. The personal computer 1 includes a controller 10, a hard disk drive (HDD) 14 storing various programs and data, a display unit 15, an input unit 16, a network interface card (NIC) 17 such as a LAN adapter for connecting to the personal computer 1 via the network 5, and a CD-ROM drive 18 for reading data stored on CD-ROMs, all of which components are connected to each other and capable of communicating with each other via an internal bus 19.

Here, the device corresponding to the computer in the invention is not limited to the personal computer 1 having this construction, but may be another terminal device, such as a personal digital assistant (PDA) terminal.

The display unit 15 is a liquid crystal display (LCD) or other display device and is connected to the controller 10 via a video board or graphics board (not shown). A UI window, mouse pointer, or the like is displayed on the display unit 15 for setting printing conditions (control settings) for the printer 2 and multifunction device 4. This display is implemented through a graphical user interface (GUI) function well known in the art possessed by the personal computer 1.

The input unit 16 is a keyboard, mouse, or other input device and is connected to the controller 10 via a USB terminal or PS/2 terminal (not shown). The input unit 16 is operated by the user to input settings for printing conditions in the printer 2 and multifunction device 4 into the controller 10.

The controller 10 performs overall control of the various components in the personal computer 1 and includes a CPU 11, a ROM 12, and a RAM 13 well known in the art. The controller 10 is configured of a circuit board, on which are mounted modules for the CPU 11, ROM 12, and RAM 13, and is commonly referred to as a mother board.

An operating system (OS) is installed on the personal computer 1. Various software programs including the installation program and application program described later operate in the OS environment. In the description of the embodiments, the Windows® OS is installed on the personal computer 1, but it should be apparent that the invention may be applied to a personal computer having a different OS installed.

The HDD 14 is integrally configured of a high-capacity disk and a reading device. The HDD 14 is provided with a system folder (not shown) storing various system files required for operating the OS, a program folder 14P (see FIG. 5, etc.) described later for storing application programs and the like, and a registry 14R (see FIG. 16, etc.) described later in which various settings for system files and applications are recorded.

In the embodiments, an example application program stored in the program folder 14P of the HDD 14 is a program having functions for controlling the printer 2, scanner 3, multifunction device 4, and other peripheral devices in conjunction with device drivers corresponding to these peripheral devices. For example, when printing using the printer 2 or multifunction device 4, a printer application program is launched to display a UI window on the display unit 15 of the personal computer 1 for receiving settings inputted by the user and for executing a printing operation in conjunction with the printer driver based on the inputted settings. A similar process is performed for reading image data with the scanner 3.

Note that an application program is software for performing specific operations, such as word processing software, image processing software, and the like. A device driver is software for controlling a peripheral device connected to the personal computer to work properly.

These application programs are installed on the personal computer 1 with an installation package. The installation package includes as a set the application program itself, various files storing data and the like used when executing the program, and an installer for installing the program on the personal computer 1.

The installation package of the embodiments also includes files storing data (information) related to display formats preset by the software provider for screens that the application program displays on the display unit 15 of the personal computer 1. The software provider sets the display format based on the type of end-user, such as a company or individual. Data related to the screen display format is recorded in the personal computer 1 when the application program is installed on the personal computer 1. Thereafter, the application program installed on the personal computer 1 sets the display format from the plurality of formats based on the format-related data and displays screens, such as the startup screen and UI window, on the display unit 15 of the personal computer 1 according to the set display format.

In the following first through sixth embodiments, a series of processes will be described involving a process for installing application programs from the installation package on the personal computer 1, and a process for starting the installed application programs on the personal computer 1 and displaying screens such as the startup screen and UI window in the display format preset by the software provider.

<Installation Package According to First Embodiment>

Figure 3:
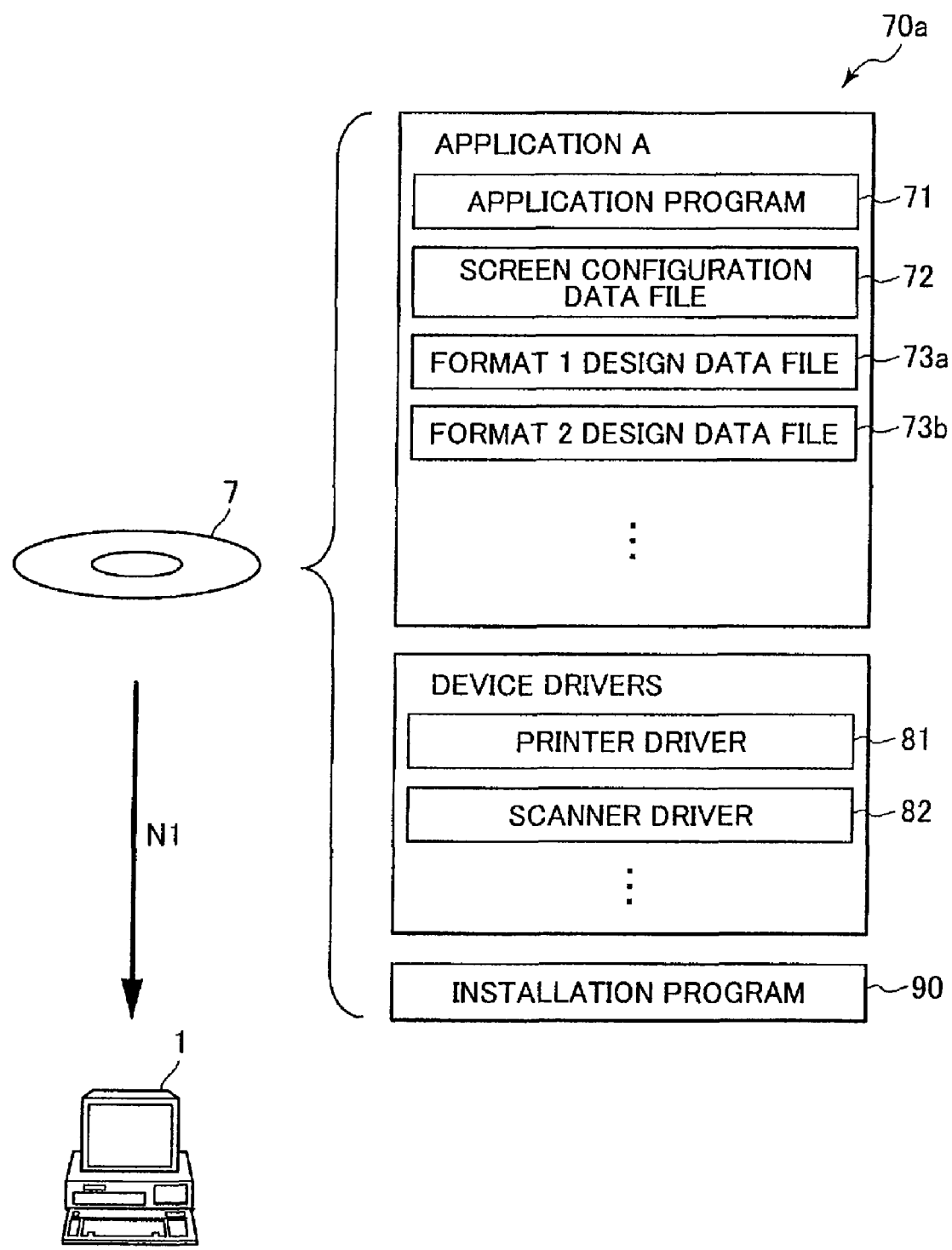
FIG. 3 is an explanatory diagram conceptually illustrating the general structure of an installation package according to a first embodiment.

A storage medium storing an installation package according to a first embodiment will be described while referring to FIGS. 3 through 7. FIG. 3 is an explanatory diagram conceptually illustrating the general structure of an installation package 70a according to a first embodiment.

As shown in FIG. 3, the installation package 70a includes a group of files related to an application A to be installed on the personal computer 1; a printer driver 81, scanner driver 82, and other device drivers for controlling the printer 2, scanner 3, multifunction device 4, and other peripheral devices connected to the personal computer 1; and an installation program 90 for installing the application A and the device drivers on the personal computer 1.

The software provider distributes a CD-ROM 7 or similar flexible storage medium on which the installation package 70a is stored. The data in the installation package 70a is read from the storage medium by the CD-ROM drive 18 of the personal computer 1 (arrow N1) or other storage device corresponding to the storage medium (an identical configuration is used in the subsequent embodiments). Alternatively, the application program and device drivers may be distributed to the user through the Internet from a server of the software provider.

The installation package 70a includes a group of files related to the application A, including an application program 71, which is the main program of the application A; a screen configuration data (information) file 72; and screen display data (information) files including a format 1 design data file 73a and a format 2 design data file 73b.

The screen configuration data file 72 stores settings data (settings information) for the display format of screens displayed by the application program 71 (hereinafter referred to as the "screen type"), including data specifying the screen type, and data specifying the screen configuration in this screen type (number of tabs and buttons functioning as the GUI, for example). The software provider prepares a plurality of modifications of the screen type in the application A of the embodiments (hereinafter, the embodiments will denote the first embodiment and all subsequent embodiments), including formats 1, 2, . . . for displaying screens corresponding to the end-user intended by the software provider. The screen configuration data file 72 specifies which of the screen types included in the installation package 70a, i.e., the formats 1, 2, . . . , that the application program 71 will use to display screens.

The format 1 design data file 73a and format 2 design data file 73b are files storing data related to the appearance of screens displayed according to screen types of the formats 1 and 2 described above and include data specifying the functions, shapes, size, placement, and the like of the tabs, buttons, and the like displayed in the screens; image data; and the like. For the sake of description, only the two design data files 73a and 73b corresponding to the two screen types are listed in the present embodiment. However, each installation package may hold three or more design data files corresponding to numerous screen types.

When executed under the OS of the personal computer 1, the installation program 90 acquires instructions and various parameters from the user and executes a process to install the application program 71, various files related to the application A, and device drivers on the personal computer 1.

Below, descriptions will be given for a process in which the installation program 90 installs the application program 71 and the above files related to the application A on the personal computer 1, and a process in which the application program 71 installed on the personal computer 1 performs to display windows of the screen type predefined from the plurality of screen types.

<Installation Process According to First Embodiment>

Figure 4:
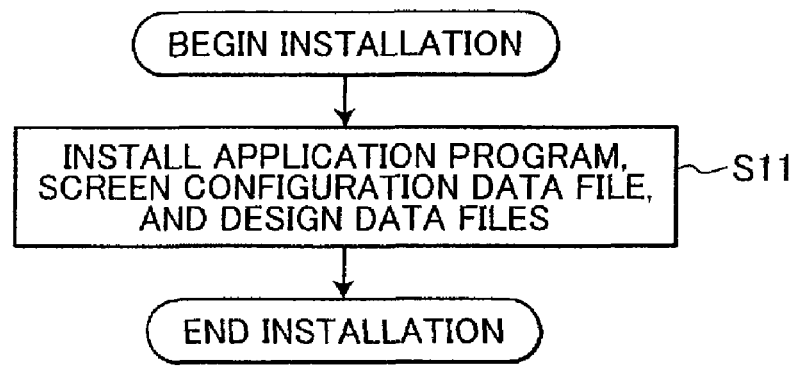
FIG. 4 is a flowchart illustrating steps in a main process executed by an installation program according to the first embodiment.

FIG. 4 is a flowchart illustrating steps in a main process executed by the installation program 90 according to the first embodiment. The personal computer 1 executes this process according to the installation program 90 after the user inserts the CD-ROM 7 storing the installation package 70a in the CD-ROM drive 18 of the personal computer 1 and starts the installation program 90 by performing a predetermined operation on the personal computer 1. This process will be referred to as the installation process in the following description.

In step (hereafter, step will be abbreviated as "S") 11 at the beginning of the installation process in FIG. 4, the personal computer 1 (installation program 90) reads the application program 71, screen configuration data file 72, and design data files 73a and 73b from the installation package 70a, and installs the files in a predetermined region of the program folder 14P provided on the HDD 14 of the personal computer 1. Subsequently, the installation process ends.

Figure 5:
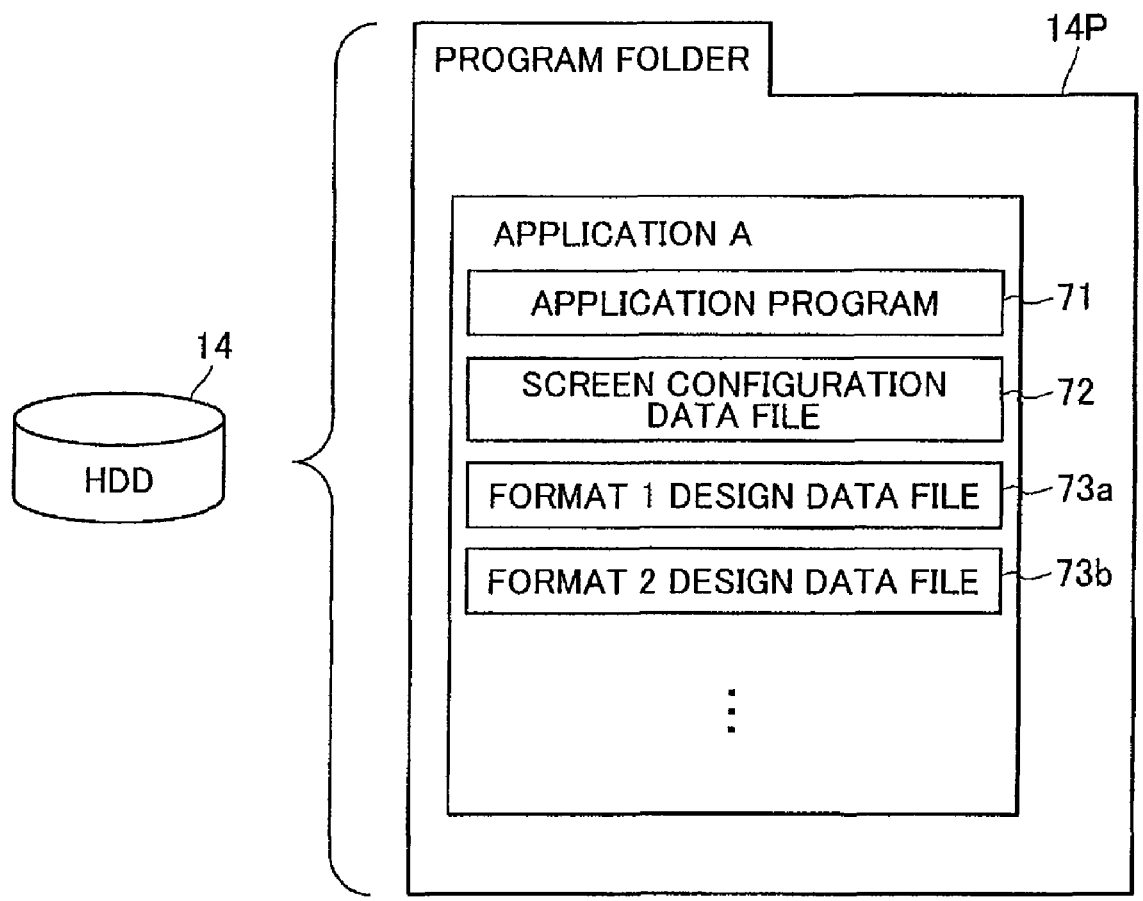
FIG. 5 is an explanatory diagram conceptually illustrating the configuration of files related to an application installed on an HDD of the personal computer.

FIG. 5 shows the configuration of each file related to the application A that has been installed in the program folder 14P of the HDD 14 after the personal computer 1 executes the installation process based on the installation program 90.

As shown in FIG. 5, using the installation package 70a according to the first embodiment, the application program 71, screen configuration data file 72, and design data files 73a and 73b corresponding to formats 1 and 2 have been installed in the program folder 14P of the HDD 14 according to the installation program 90 as files related to the application A.

<Application Startup Process According to First Embodiment>

Figure 6:
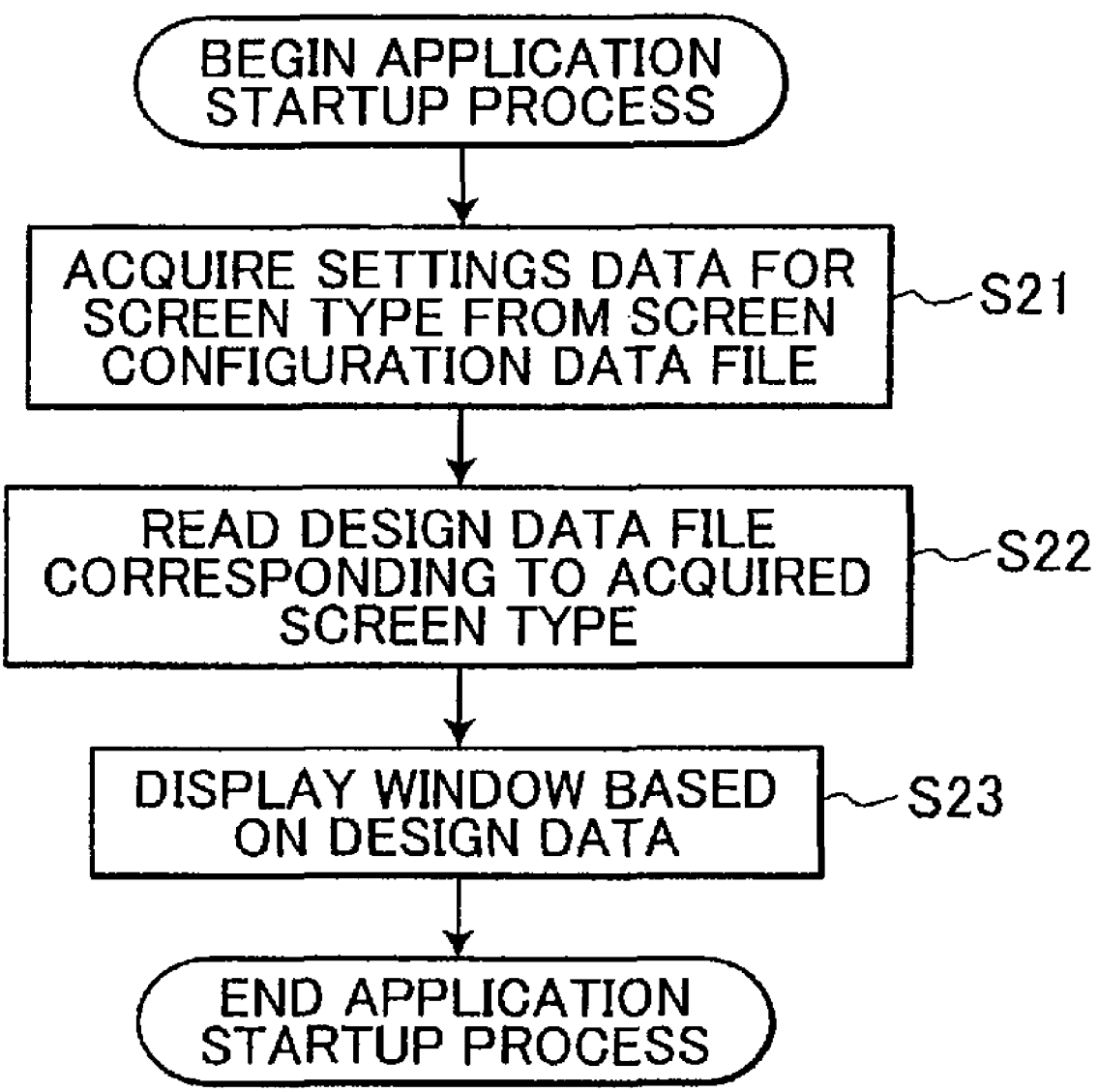
FIG. 6 is a flowchart illustrating steps in a process for setting the screen type used when an application program according to the first embodiment installed on the personal computer is started, and for displaying a screen based on the set screen type.
Figure 7:
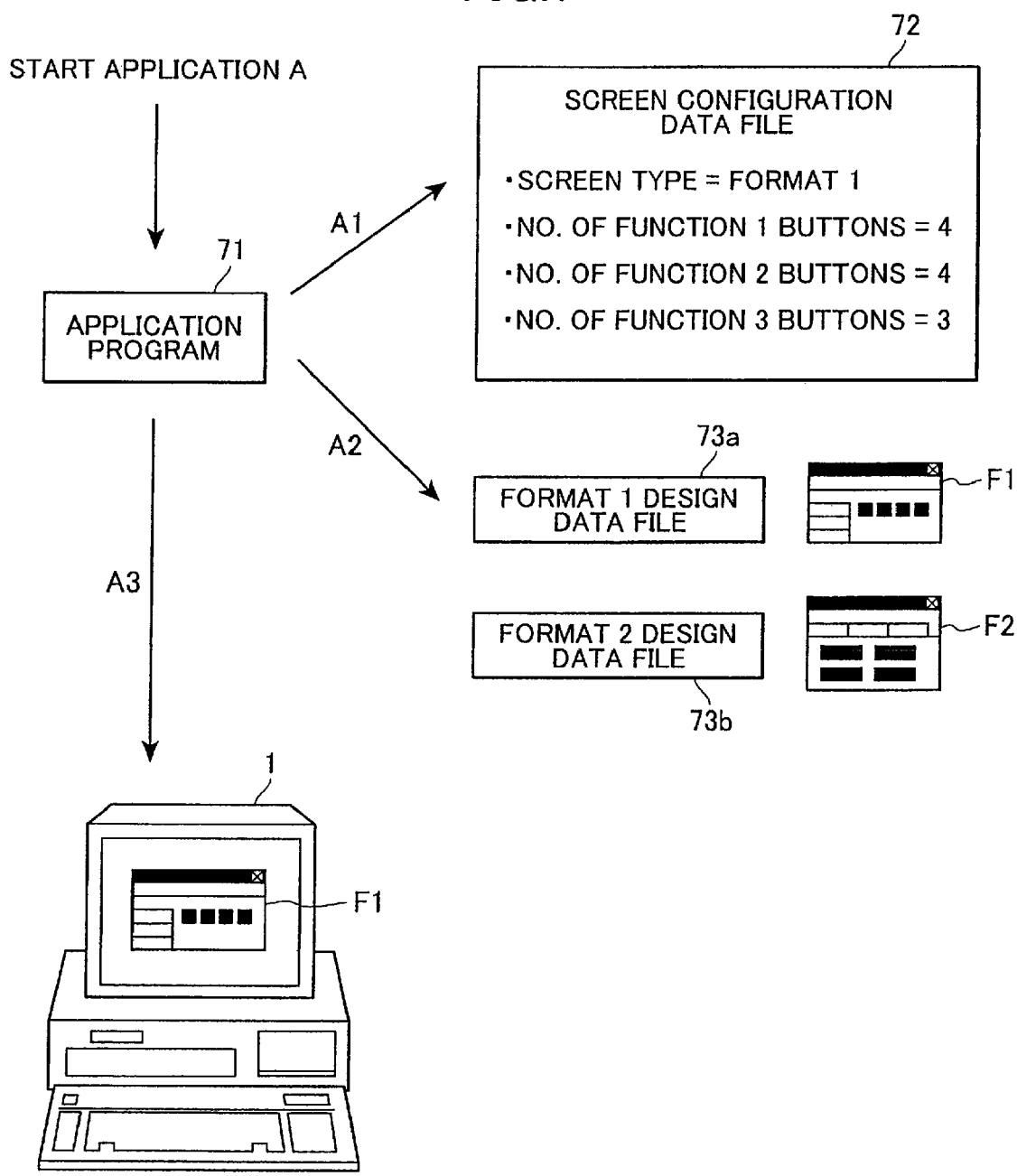
FIG. 7 is an explanatory diagram conceptually illustrating an example in which the process shown in the flowchart of FIG. 6 is executed.

FIG. 6 is a flowchart illustrating steps in a process for setting the screen type used when the application program 71 according to the first embodiment installed on the personal computer 1 is started, and for displaying a screen based on the set screen type. FIG. 7 is an explanatory diagram conceptually illustrating a case in which the process shown in the flowchart of FIG. 6 is executed. The personal computer 1 executes this process as a process of the application program 71 when the user performs a predetermined operation on the personal computer 1 to launch the application A. In the following description, this process will be referred to as the application startup process.

In S21 at the beginning of the application startup process of FIG. 6, the personal computer 1 (application program 71) acquires settings data for the screen type from the screen configuration data file 72 stored in the program folder 14P. In S22 the personal computer 1 reads the design data file corresponding to the screen type specified in the settings data acquired in S21. In S23 the personal computer 1 displays a predetermined screen, such as a startup screen or UI window on the display unit 15 based on the design data file read in S22. Subsequently, the application startup process ends.

An example of executing this application startup process will be described next based on FIG. 7. When the application A is started, the application program 71 first references the screen configuration data file 72 stored in the program folder 14P (arrow A1). In this example, data specifying the screen type as format 1 and data specifying the number of buttons functioning as the GUI in a window of format 1 are stored in the screen configuration data file 72 as settings data for the screen type (format 1). The application program 71 acquires the settings data for the screen type (format 1) from the screen configuration data file 72.

Next, the application program 71 reads the format 1 design data file 73a from the design data files 73a and 73b corresponding to the screen types based on the settings data for the screen type acquired above (arrow A2). As shown in FIG. 7, the format 1 design data file 73a and the format 2 design data file 73b include data for displaying a format 1 design F1 (a design corresponding to format 1) and a format 2 design F2 (a design corresponding to format 2), respectively. Next, the application program 71 displays a UI window in the format 1 design F1 on the display unit 15 of the personal computer 1 based on the data read from the format 1 design data file 73a (arrow A3).

If the screen configuration data file 72 stored settings data specifying the screen type as format 2 in the explanatory diagram of FIG. 7, then the application program 71 would read the format 2 design data file 73b corresponding to format 2 and display a UI window in the format 2 design F2 on the display unit 15 of the personal computer 1.

<Installation Package According to Second Embodiment>

A storage medium storing an installation package according to a second embodiment will be described while referring to FIGS. 8 and 9.

The first embodiment above described a case in which the installation package 70a includes a single screen configuration data file 72. The installation package according to the second embodiment has a plurality of screen configuration data files 72a and 72b corresponding to a plurality of predetermined peripheral devices that the application A can control. The following description addresses the case in which one of the plurality of screen configuration data files 72a and 72b is installed on the personal computer 1.

In the second embodiment, the application A is capable of controlling a plurality of peripheral devices connected to the personal computer 1 and has a function for controlling peripheral devices preset as control targets when installed on the personal computer 1. At this time, the application A displays a window of the screen type preset for each peripheral device targeted for control. To simplify the description, two peripheral devices will be assumed as the peripheral devices that can be controlled by the application A in the second embodiment. These devices are the printer 2 and scanner 3. However, the application A may be configured to control three or more peripheral devices, including the multifunction device 4 or other peripheral devices.

Figure 8:
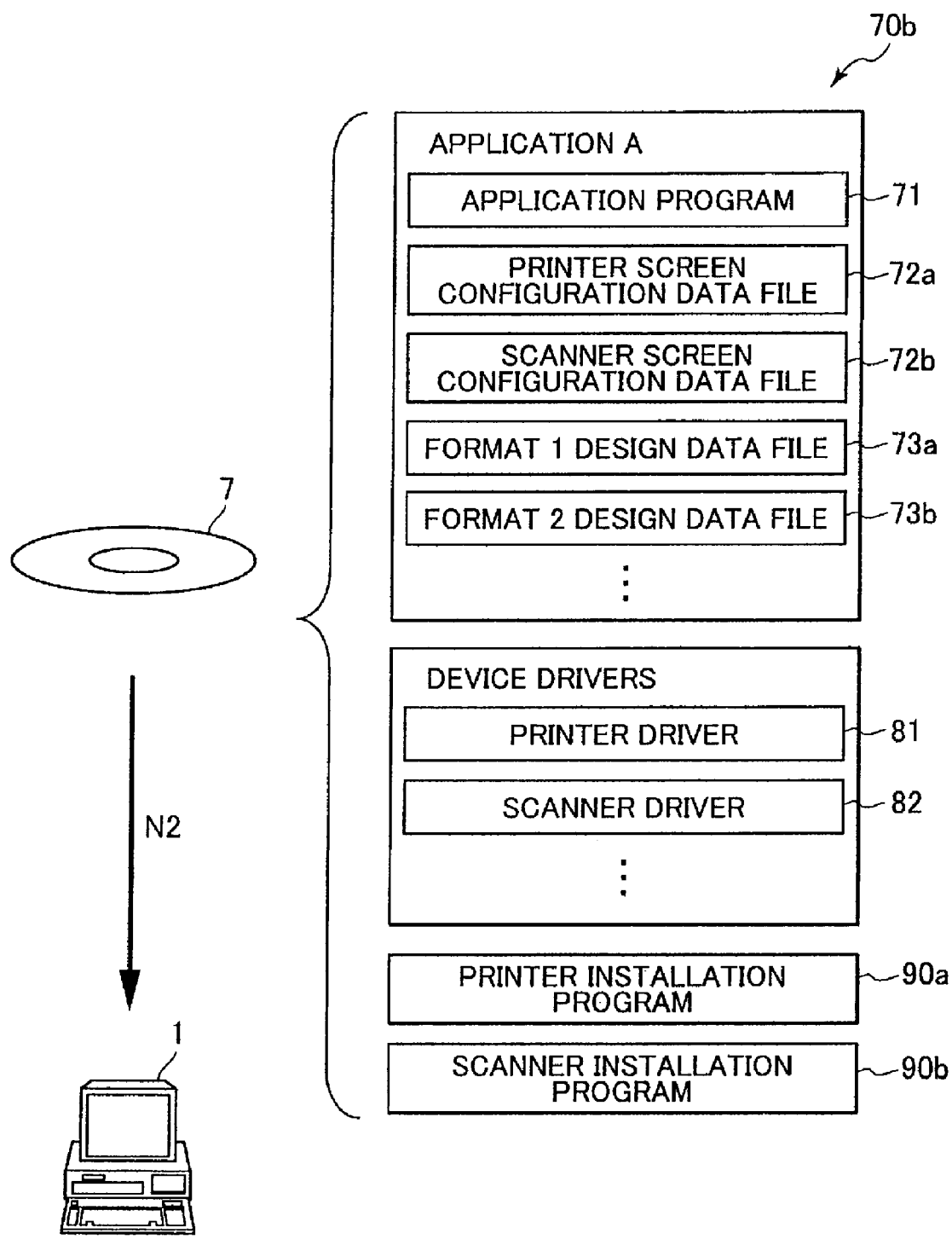
FIG. 8 is an explanatory diagram conceptually illustrating the overall structure of an installation package according to a second embodiment.

FIG. 8 is an explanatory diagram conceptually illustrating the overall structure of an installation package 70b according to the second embodiment. The installation package 70b according to the second embodiment primarily differs from the installation package 70a according to the first embodiment (see FIG. 3) by having a plurality of screen configuration data files in place of the screen configuration data file 72 in the first embodiment, including the printer screen configuration data file 72a and scanner screen configuration data file 72b, and a plurality of installation programs in place of the installation program 90 in the first embodiment, including a printer installation program 90a and a scanner installation program 90b.

The screen configuration data files 72a and 72b specify the screen type displayed by the application program 71 (format 1, 2, ...) for the printer 2 and scanner 3, respectively, which are control targets of the application A. The data structure of the screen configuration data files 72a and 72b is identical to that of the screen configuration data file 72 in the first embodiment.

The printer installation program 90a installs the application A on the personal computer 1 as an application for controlling the printer 2. The scanner installation program 90b installs the application A on the personal computer 1 as an application for controlling the scanner 3.

Note that the application A may be any type of application which has an inputting function from a scanner and an outputting function to a printer. Examples are image processing software and word processing software.

Since the remaining structure of the installation package 70b is essentially identical to the installation package 70a in the first embodiment, like parts and components with the installation package 70a have been designated with the same reference numerals to avoid duplicating description.

In order to set the control target of the application A during installation, the personal computer 1 executes an autorun program (not shown) stored on the CD-ROM 7 along with the installation package 70b when the CD-ROM 7 is inserted into the CD-ROM drive 18 of the personal computer 1. Based on the autorun program, the personal computer 1 displays a dialog box on the display unit 15 of the personal computer 1 for setting a peripheral device as the control target and receives an instruction from the user specifying a peripheral device as the control target of the application A, for example. Subsequently, the personal computer 1 runs the installation program corresponding to the user-specified peripheral device in order to install the application A on the personal computer 1.

With the installation package 70b according to the second embodiment, the personal computer 1 starts the printer installation program 90a to install the application A when the user inputs an instruction for installing the application A on the personal computer 1 as an application for controlling the printer 2. Similarly, the personal computer 1 starts the scanner installation program 90b for installing the application A when the user inputs an instruction for installing the application A on the personal computer 1 as an application for controlling the scanner 3.

When the printer installation program 90a executes the installation process, the printer installation program 90a selects the printer screen configuration data file 72a from the plurality of screen configuration data files provided in the installation package 70b and installs the printer screen configuration data file 72a in a predetermined region of the program folder 14P provided in the HDD 14 according to the same procedure in the installation process in the first embodiment (see FIG. 4).

However, when the scanner installation program 90b executes the installation process, the scanner installation program 90b selects the scanner screen configuration data file 72b and installs the scanner screen configuration data file 72b in the predetermined region of the program folder 14P according to the same procedure.

In this way, a device is selected and the screen configuration data file 72a or 72b for the selected device is installed from the CD-ROM 7 to the personal computer 1 (arrow N2).

Figure 9:
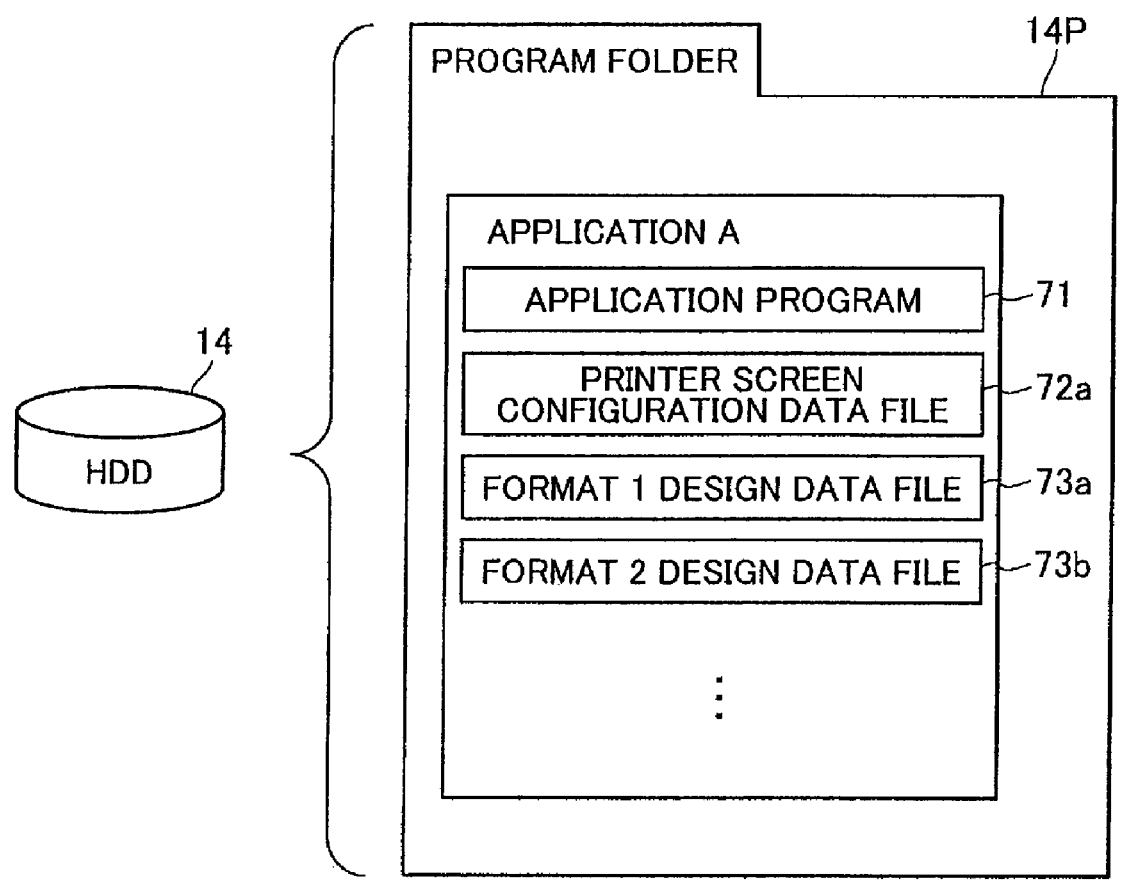
FIG. 9 is an explanatory diagram conceptually illustrating the configuration of files related to the application installed on the HDD of the personal computer in the second embodiment.

FIG. 9 is an explanatory diagram conceptually illustrating the storage area in the HDD 14 of the personal computer 1 after various files related to the application A have been installed. In this example, the printer installation program 90a has installed the application A as an application for controlling the printer 2.

As shown in FIG. 9, the printer installation program 90a has installed the application program 71, the printer screen configuration data file 72a, and the design data files 73a and 73b in the program folder 14P of the HDD 14 as files related to the application A.

If the scanner installation program 90b installed the application A as an application for controlling the scanner 3 in FIG. 9, then the scanner screen configuration data file 72b would have been installed on the program folder 14P of the HDD 14 in place of the printer screen configuration data file 72a.

Here, the process in which the application program 71 installed on the personal computer 1 with the installation package 70b of the second embodiment selects a screen type on startup and displays a window according to the selected screen type (application startup process) is identical to the process described in the first embodiment and will not be repeated here. However, in the second embodiment, the "screen configuration data file 72" term used in the description of the application startup process according to the first embodiment (see FIGS. 6 and 7) is replaced by the "printer screen configuration data file 72a" or the "scanner screen configuration data file 72b."

Note that the format 1 design data file 73a and format 2 design data file 73b can be commonly used for both the printer and the scanner. However, separate design data files 73a and 73b may be prepared for each of the printer and the scanner.

<Installation Package According to Third Embodiment>

A storage medium storing an installation package according to a third embodiment will be described while referring to FIGS. 10 through 13.

In the second embodiment described above, the installation package includes a plurality of the screen configuration data files 72a and 72b corresponding to a plurality of predetermined peripheral devices that the application A can control, and one of the screen configuration data files 72a and 72b is installed on the personal computer 1. In the third embodiment, the plurality of screen configuration data files 72a and 72b corresponding to the peripheral devices that the application A can control are installed on the personal computer 1, and the application program 71 displays windows by referencing one of the screen configuration data files 72a and 72b upon startup.

In the third embodiment, the application A is capable of controlling a plurality of peripheral devices connected to the personal computer 1 and has a function for acquiring data specifying the peripheral devices targeted for control upon startup and for controlling the targeted peripheral device based on the acquired data. At this time, the application A selects a screen type based on the screen configuration data file corresponding to the targeted peripheral device and displays windows based on the screen type. As in the second embodiment, the application A is capable of controlling two peripheral devices in the third embodiment. These devices are the printer 2 and scanner 3.

Figure 10:
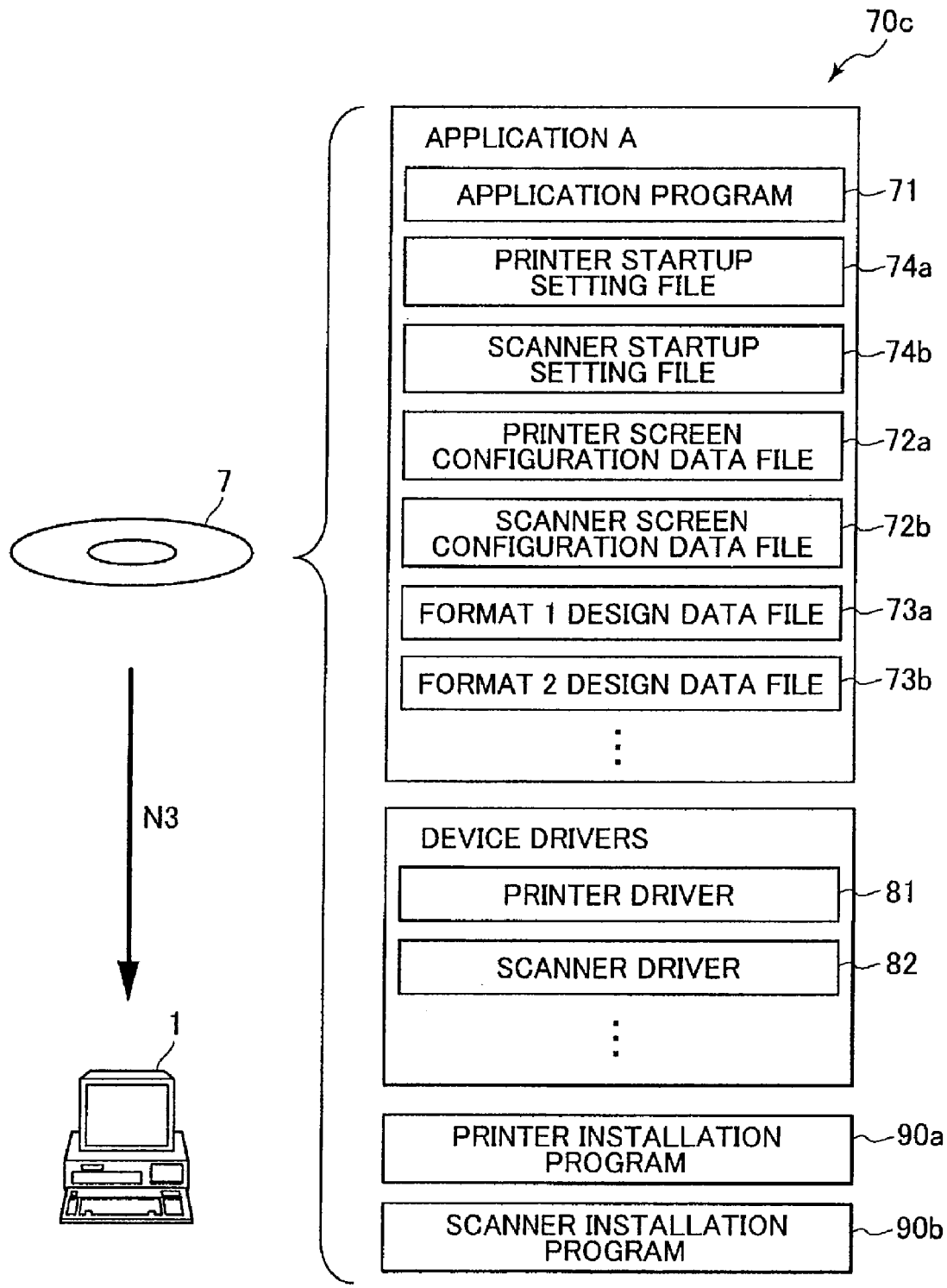
FIG. 10 is an explanatory diagram conceptually illustrating the overall structure of an installation package according to a third embodiment.

FIG. 10 is an explanatory diagram conceptually illustrating the overall structure of an installation package 70c according to the third embodiment. The installation package 70c according to the third embodiment primarily differs from the installation package 70b according to the second embodiment (see FIG. 8) in that the installation package 70c also includes a plurality of startup setting files represented by a printer startup setting file 74a and a scanner startup setting file 74b.

A startup setting file in this specification denotes a file for storing data that specifies a startup mode entered when starting the application A, where the startup mode indicates which of the peripheral devices is controlled. Specifically, the printer startup setting file 74a stores data for starting up the application A as an application for controlling the printer 2 (i.e., startup mode=printer mode). The scanner startup setting file 74b stores data for starting the application A as an application for controlling the scanner 3 (i.e., startup mode=scanner mode).

As in the second embodiment, the printer installation program 90a in the installation package 70c according to the third embodiment is started for installing the application A when the user inputs an instruction for installing the application A on the personal computer 1 to control the printer 2. At this time, the printer installation program 90a executes an installation process according to the same procedure as the process described in the first embodiment (see FIG. 4). However, the printer installation program 90a in the third embodiment also installs the printer startup setting file 74a provided in the installation package 70c in the predetermined region of the program folder 14P.

On the other hand, the scanner installation program 90b is started for installing the application A when the user inputs an instruction for installing the application A to control the scanner 3. At this time, the scanner installation program 90b executes an installation process according to the same procedure described above, but also installs the scanner startup setting file 74b provided in the installation package 70c in the predetermined region of the program folder 14P.

In this way, a device is selected and the startup setting file 74a or 74b for the selected device is installed from the CD-ROM 7 to the personal computer 1 (arrow N3).

Regardless of whether the application A is installed according to the printer installation program 90a or scanner installation program 90b, both the printer screen configuration data file 72a and scanner screen configuration data file 72b are installed on the personal computer 1 in the third embodiment.

Figure 11:
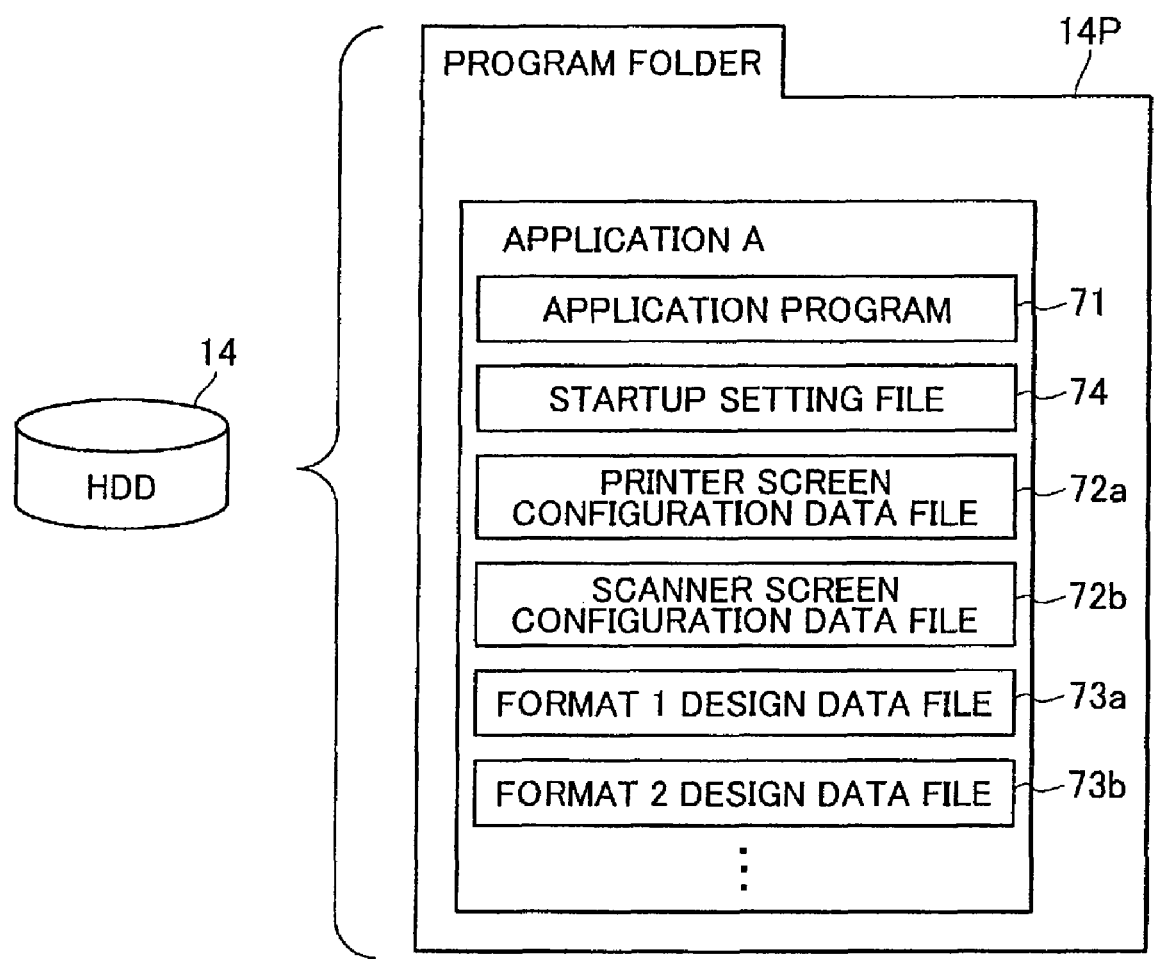
FIG. 11 is an explanatory diagram conceptually illustrating the configuration of files related to the application installed on the HDD of the personal computer in the third embodiment.

FIG. 11 is an explanatory diagram conceptually illustrating the state of the predetermined region in the HDD 14 after installing files related to the application A according to the third embodiment. As shown in FIG. 11, each of the installation programs 90a and 90b installs the application program 71, a startup setting file 74 described below, screen configuration data files 72a and 72b, and design data files 73a and 73b in the program folder 14P of the HDD 14 as the files related to the application A.

Here, the startup setting file 74 includes data for setting the startup mode of the application A to either the printer mode or the scanner mode. Whether the printer installation program 90a installs the printer startup setting file 74a on the personal computer 1 or the scanner installation program 90b installs the scanner startup setting file 74b on the personal computer 1, either the printer startup setting file 74a or scanner startup setting file 74b is registered in the HDD 14 of the personal computer 1 as the same startup setting file 74, but data specifying the startup mode (printer mode or scanner mode) in the startup setting file 74 differs according to each case. In this way, the application program 71 always references the same startup setting file 74 upon startup, regardless of which operating mode was set when installing the application A.

<Application Startup Process According to Third Embodiment>

Figure 12:
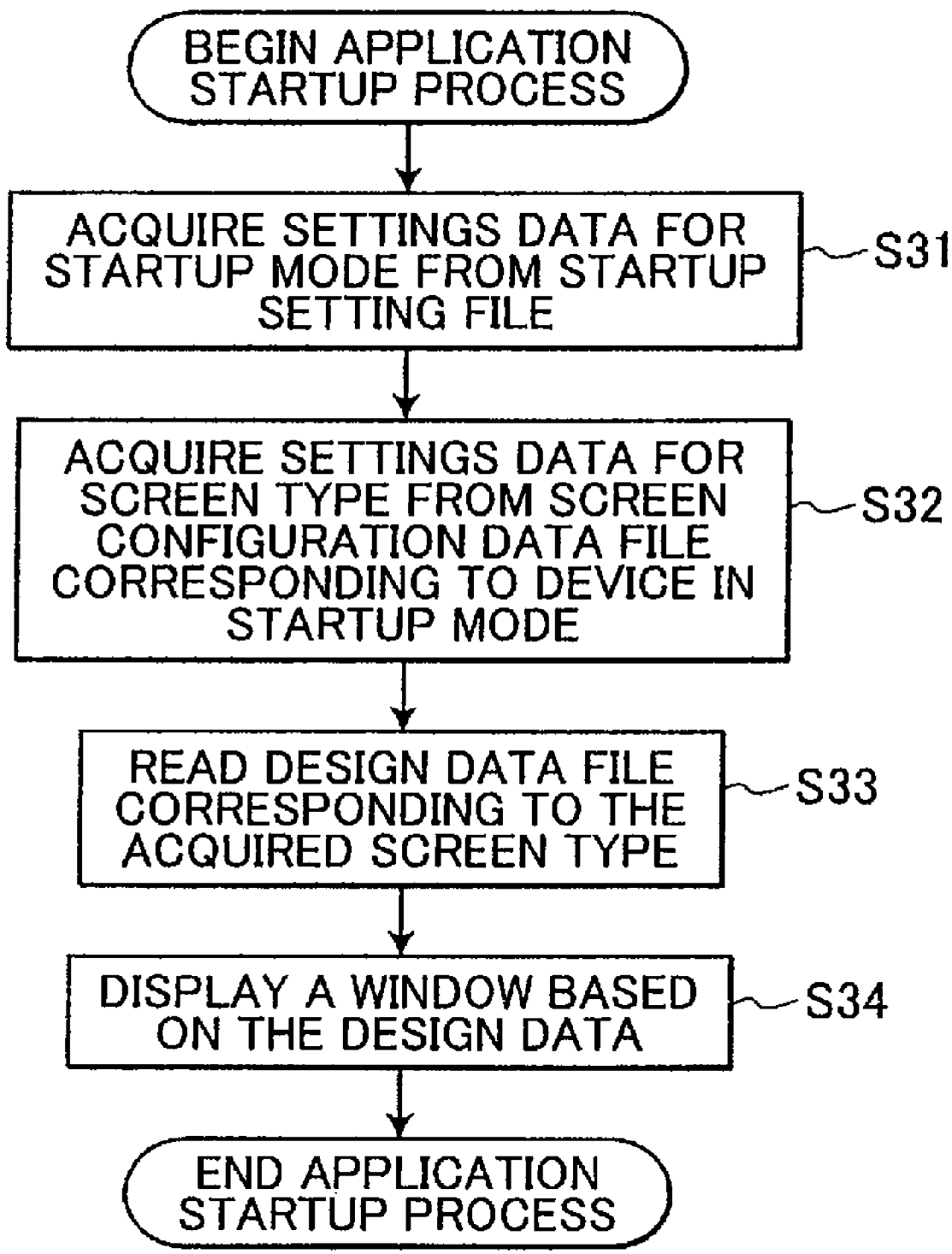
FIG. 12 is a flowchart illustrating steps in a process executed by the application program according to the third embodiment upon startup to set the screen type and display a window according to the set screen type.
Figure 13:
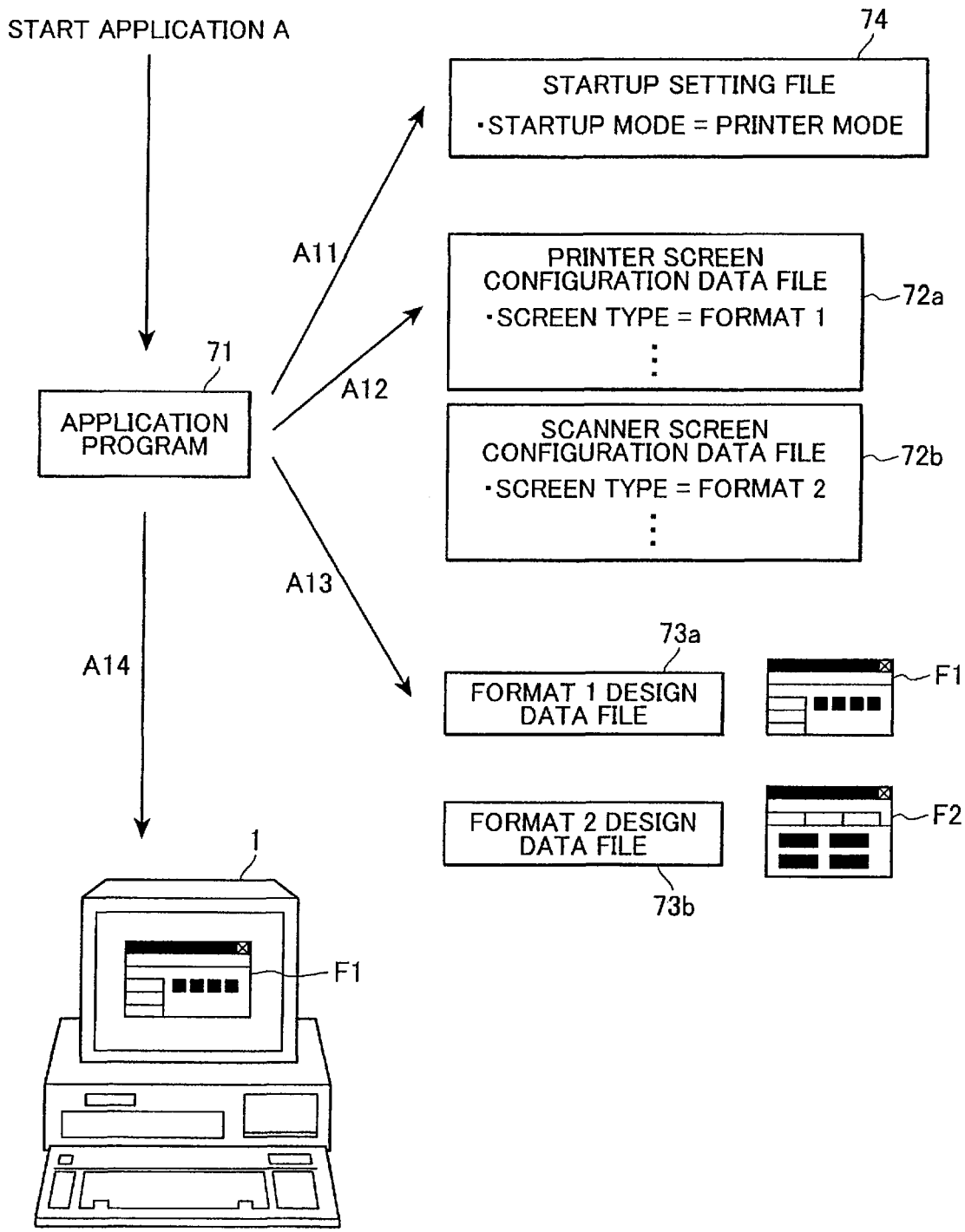
FIG. 13 is an explanatory diagram conceptually illustrating an example in which the process shown in FIG. 12 is executed.

FIG. 12 is a flowchart illustrating steps in an application startup process executed by the application program 71 according to the third embodiment installed on the personal computer 1. In this process, the application program 71 sets the screen type upon startup and displays a screen according to the set screen type. FIG. 13 is an explanatory diagram conceptually illustrating an example in which the application startup process shown in FIG. 12 is executed. The personal computer 1 executes this process as the process of the application program 71 when the user performs a predetermined operation on the personal computer 1 to start the application A.

In S31 at the start of the application startup process in FIG. 12, the personal computer 1 (application program 71) acquires settings data for the startup mode (printer mode or scanner mode) from the startup setting file 74 stored in the program folder 14P. In S32 the personal computer 1 acquires settings data for the screen type from the screen configuration data file 72a or 72b corresponding to the peripheral device for the startup mode defined by the settings data acquired in S31. In S33 the personal computer 1 further reads a design data file 73a or 73b corresponding to the screen type specified by the settings data acquired in S32. In S34 the personal computer 1 displays a predetermined window, such as a startup screen or UI window, on the display unit 15 based on the design data file. Subsequently, the application startup process ends.

Next, an example of the above application startup process will be described based on FIG. 13. When the application A is started, the application program 71 first references the startup setting file 74 stored in the program folder 14P (arrow A11). In this example, the startup setting file 74 stores settings data specifying the startup mode of the application A as the printer mode. The application program 71 acquires the settings data for the printer mode from the startup setting file 74.

Next, the application program 71 references the printer screen configuration data file 72a based on the settings data for the acquired startup mode (printer mode) from among the plurality of screen configuration data files 72a and 72b (arrow A12). In this example, the printer screen configuration data file 72a stores settings data specifying the screen type as format 1 (similar to the content of the screen configuration data file 72 shown in FIG. 7). The application program 71 acquires settings data for the screen type (format 1) from the printer screen configuration data file 72a.

Next, the application program 71 reads the format 1 design data file 73a from among the design data files 73a and 73b based on the settings data for the screen type (format 1) acquired above (arrow A13). Next, the application program 71 displays the UI window in the format 1 design F1 on the display unit 15 of the personal computer 1 based on the data read from the format 1 design data file 73a (arrow A14).

On the other hand, if the settings data for the startup mode stored in the startup setting file 74 were to define the scanner mode as the startup mode in the description of FIG. 13, the application program 71 would reference the scanner screen configuration data file 72b to acquire settings data for the screen type (format 2). Subsequently, the application program 71 would extract the format 2 design data file 73b and display the UI window of a design corresponding to the format 2 on the display unit 15 of the personal computer 1.

As a modification of the third embodiment, it is conceivable to set the startup mode based on a parameter transferred from an external device when the application program 71 is started on the personal computer 1 instead of acquiring the settings data for the startup mode by referencing the startup setting file 74. In this case, the user could perform a predetermined operation on a control panel or the like provided on the peripheral device targeted for control, for example, and the peripheral device could output a parameter specifying the startup mode to the application program 71 of the personal computer 1 based on the user's operation.

In each of the installation packages according to the first through third embodiments described above, the installation program is configured to install the window configuration data files stored in the package in the program folder 14P of the HDD 14 together with an application program.

In fourth through sixth embodiments described below, the installation program uses a registry recording tool to record settings data for the screen display type in the registry 14R provided on the HDD 14 based on the screen configuration data file stored in the installation package. In this case, the application program sets the screen type by referencing the settings data for the screen type recorded in the registry 14R when the application program is started on the computer.

<Installation Package According to Fourth Embodiment>

A storage medium storing an installation package according to a fourth embodiment will be described while referring to FIGS. 14 through 19.

Figure 14:
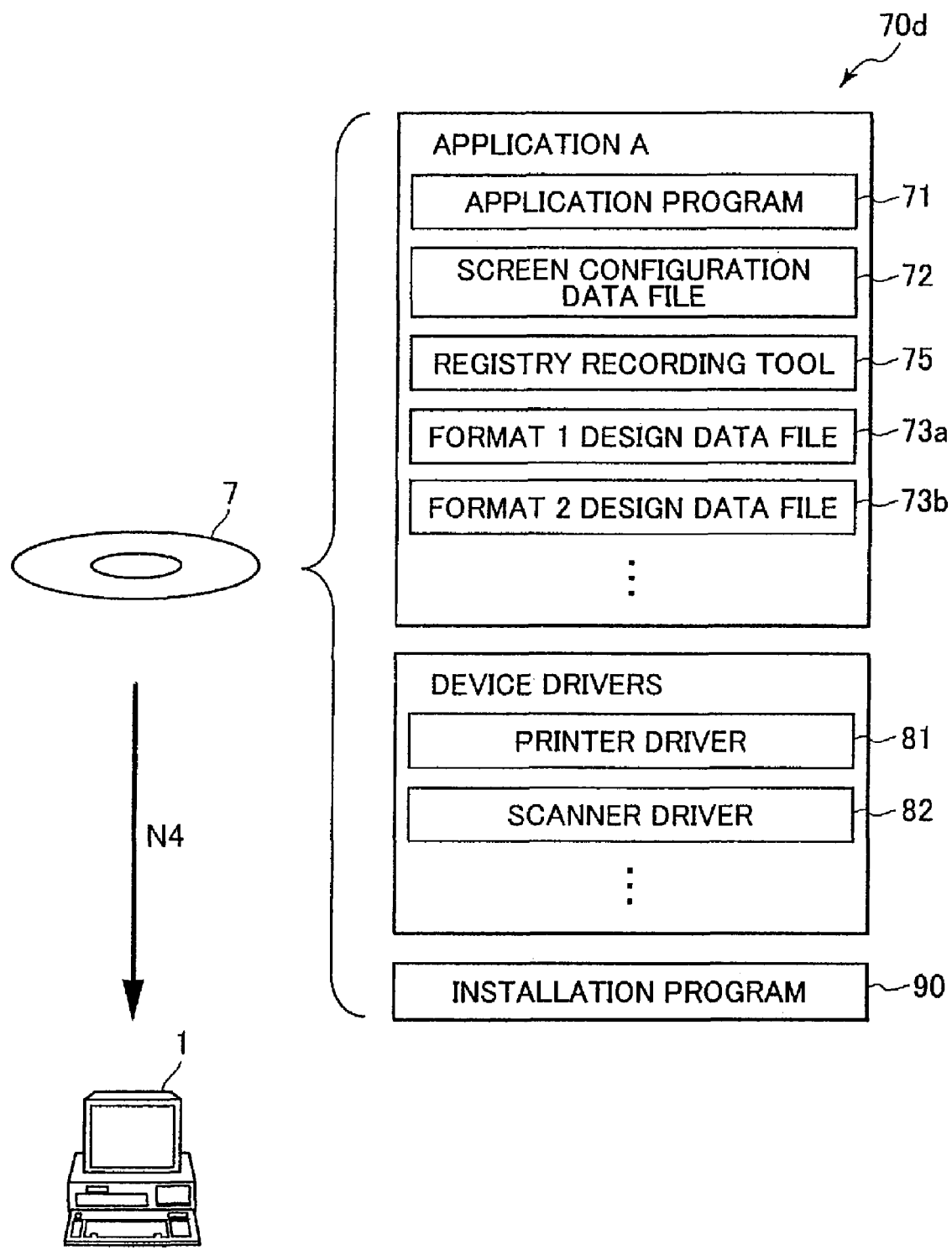
FIG. 14 is an explanatory diagram conceptually illustrating the overall structure of an installation package according to a fourth embodiment.

FIG. 14 is an explanatory diagram conceptually illustrating the overall structure of an installation package 70d according to a fourth embodiment. The installation package 70d according to the fourth embodiment primarily differs from the installation package 70a according to the first embodiment (see FIG. 3) in that the installation package 70d includes a registry recording tool 75. Since the remaining structure is essentially identical to the installation package 70a in the first embodiment, like parts and components have been designated with the same reference numerals to avoid duplicating description.

The registry recording tool 75 is a small single-function program executed by the installation program 90 when the installation program 90 installs the application A on the personal computer 1. The registry recording tool 75 has a function for recording settings data for the screen type stored in the screen configuration data file 72 of the installation package 70d in the registry 14R of the personal computer 1.

Below, a process performed when the installation program 90 installs the application A on the personal computer 1 will be described (arrow N4). In this process, the registry recording tool 75 is driven to record settings data for the screen type stored in the screen configuration data file 72 in the registry 14R of the personal computer 1.

<Registry Recording Process According to Fourth Embodiment>

Figure 15:
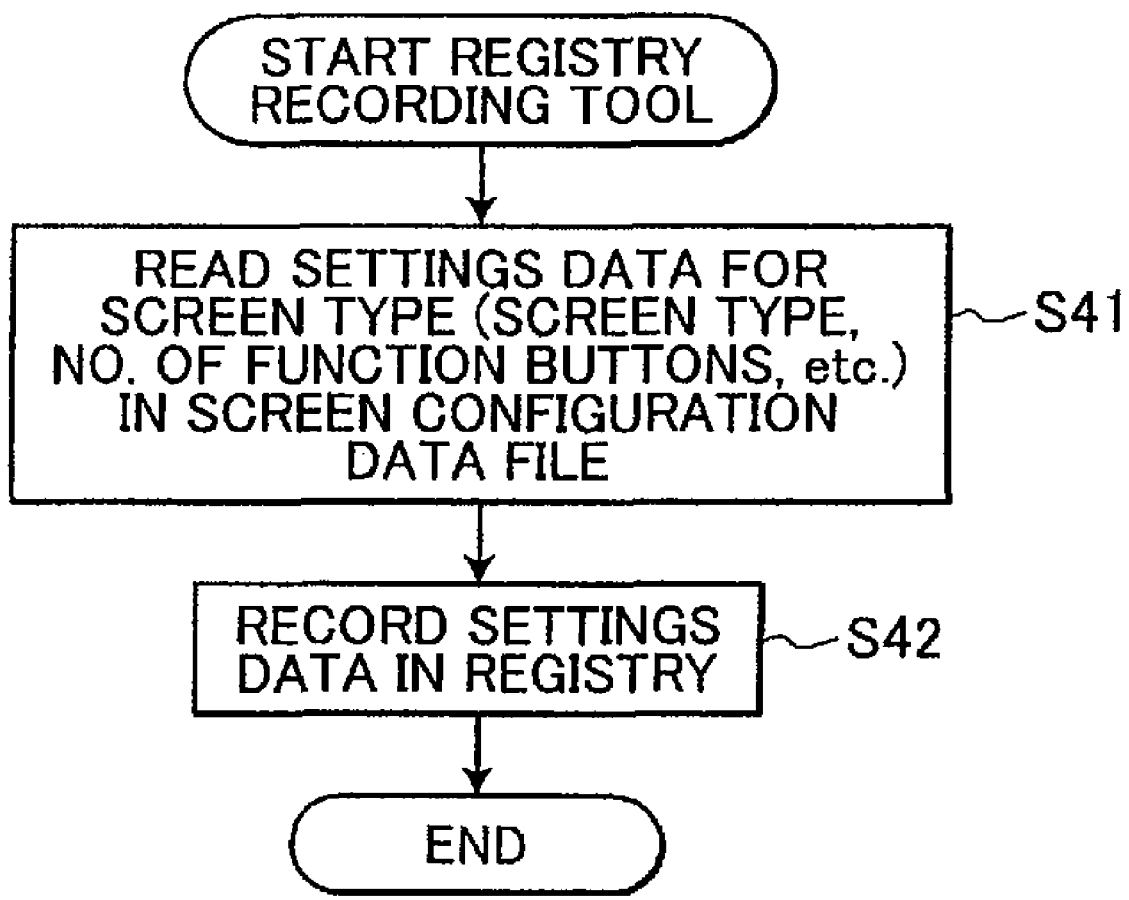
FIG. 15 is a flowchart illustrating steps in a process executed when the installation program drives the registry recording tool to record settings data of the screen type in a registry.
Figure 16:
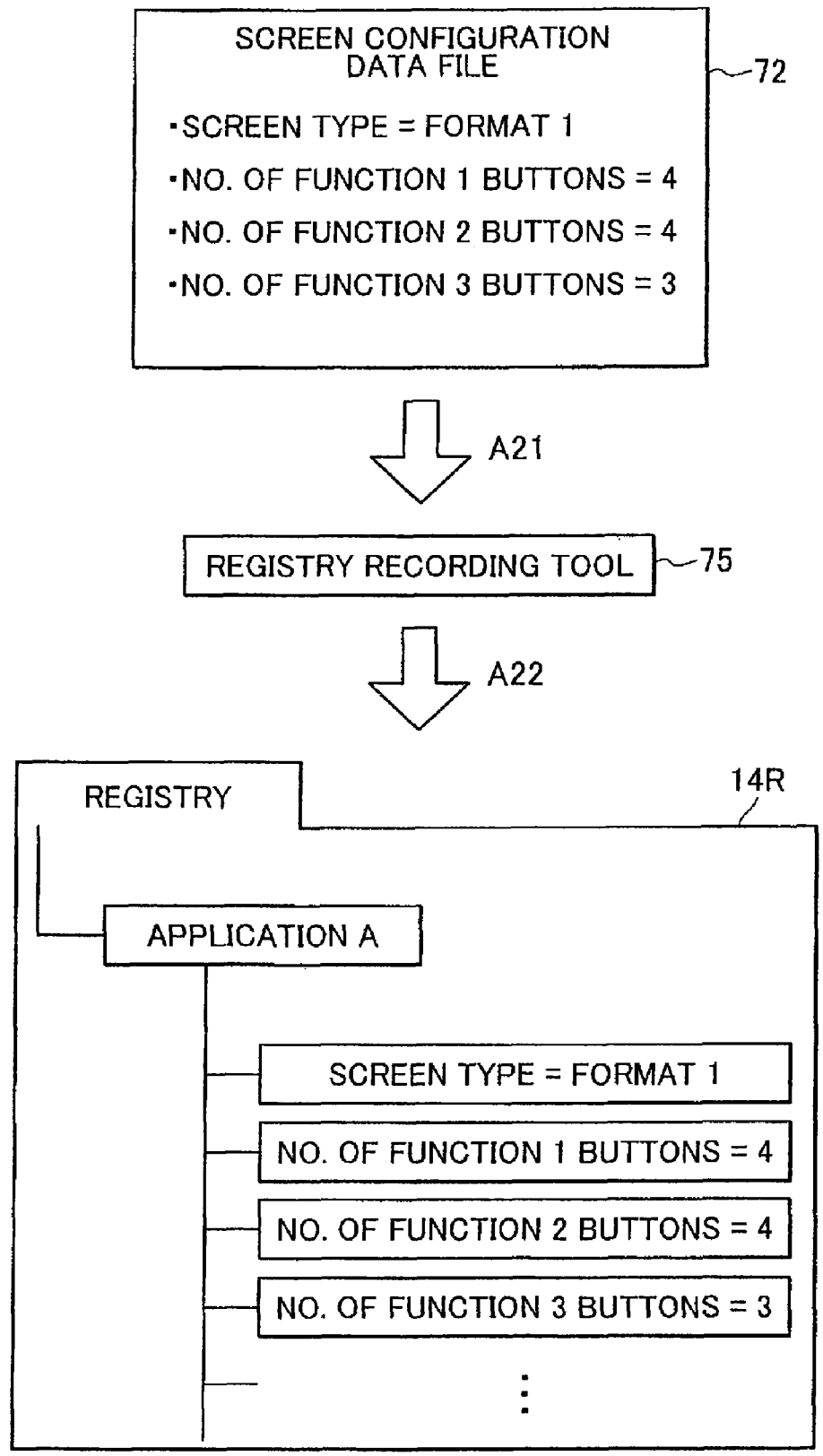
FIG. 16 is an explanatory diagram conceptually illustrating an example of executing the process according to the flowchart in FIG. 15.

FIG. 15 is a flowchart illustrating steps in a process executed when the installation program 90 drives the registry recording tool 75 to record settings data of the screen type in the registry 14R. FIG. 16 is an explanatory diagram conceptually illustrating an example of executing the process according to the flowchart in FIG. 15. This process is executed when the installation program 90 starts the registry recording tool 75 while the personal computer 1 is executing the installation process as the process of the installation program 90. This process will be referred to below as the registry recording process.

In S41 at the beginning of the registry recording process in FIG. 15, the personal computer 1 (registry recording tool 75) reads settings data for the screen type from the screen configuration data file 72. In S42 the personal computer 1 records the settings data read in S41 in the registry 14R of the HDD 14 as settings data related to the application A.

Next, an example of the above registry recording process will be described based on FIG. 16. Upon startup, the registry recording tool 75 reads settings data for the screen type stored in the screen configuration data file 72 of the installation package 70d (arrow A21). In this example, the screen configuration data file 72 stores data specifying the screen type as format 1 and data specifying the number of buttons functioning as the GUI in the format 1 screen as the settings data for the screen type. The registry recording tool 75 records this settings data for the screen type (format 1) acquired above in a predetermined region of the registry 14R (arrow A22). Accordingly, data specifying the screen type as format 1 and data specifying the number of buttons functioning as the GUI are recorded in the registry 14R as settings data related to the application A.

Figure 17:
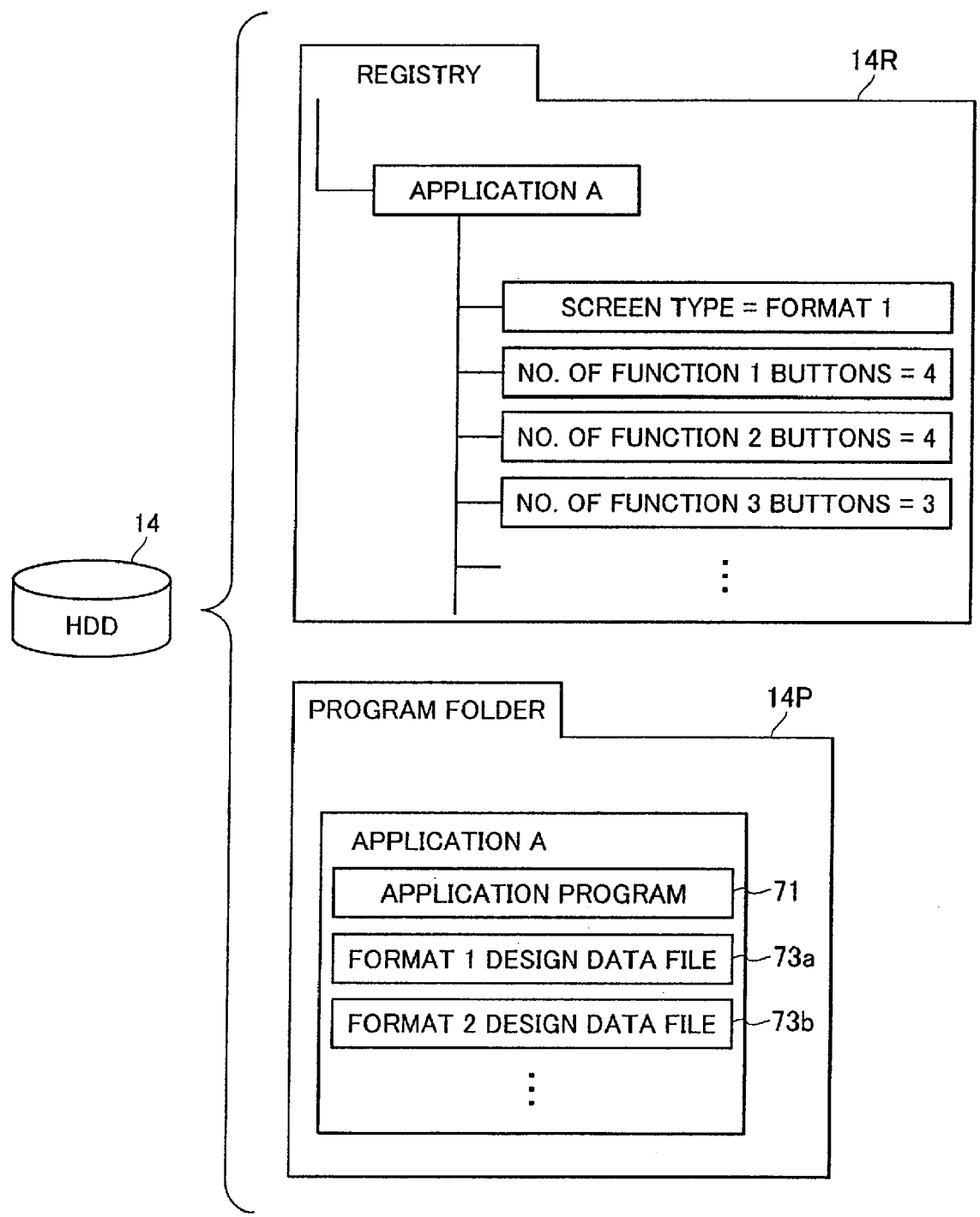
FIG. 17 is an explanatory diagram conceptually illustrating the configuration of files related to the application installed on the HDD of the personal computer in the fourth embodiment.

FIG. 17 shows the content of the HDD 14 after the installation program 90 in the installation package 70d of the fourth embodiment executes the registry recording process and installation process. Specifically, FIG. 17 shows the settings data and files related to the application A that have been installed in the registry 14R and program folder 14P in the HDD 14.

As shown in FIG. 17, with the installation package 70d according to the fourth embodiment, the installation program 90 drives the registry recording tool 75, as described above, to record settings data of the screen type in the registry 14R as settings data related to the application A.

The installation program 90 also installs the application program 71, and design data files 73a and 73b corresponding to formats 1 and 2 in the program folder 14P as files related to the application A.

<Application Startup Process According to Fourth Embodiment>

Figure 18:
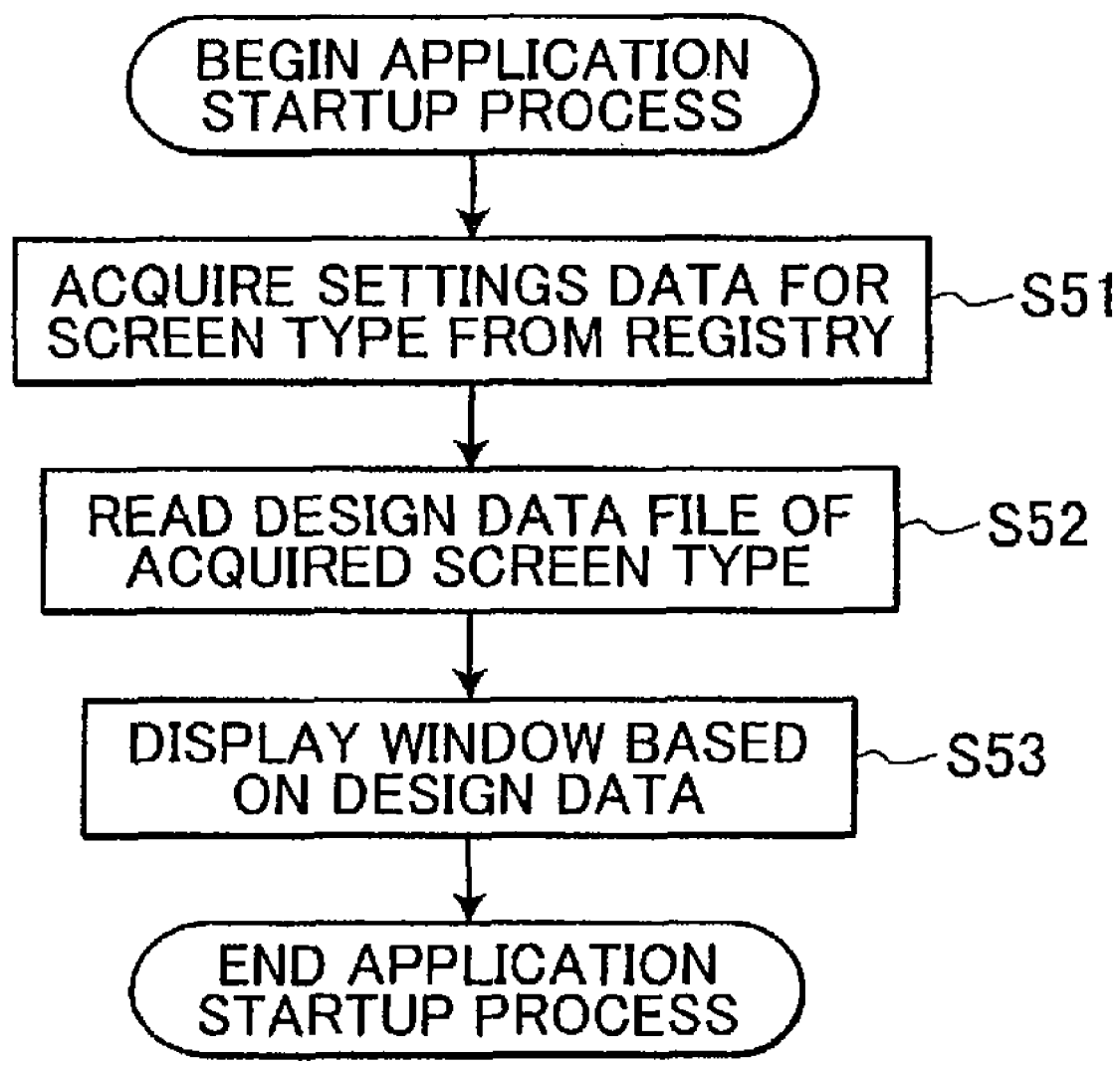
FIG. 18 is a flowchart illustrating steps in a process executed by the application program according to the fourth embodiment upon startup to set the screen type and display a window according to the set screen type.
Figure 19:
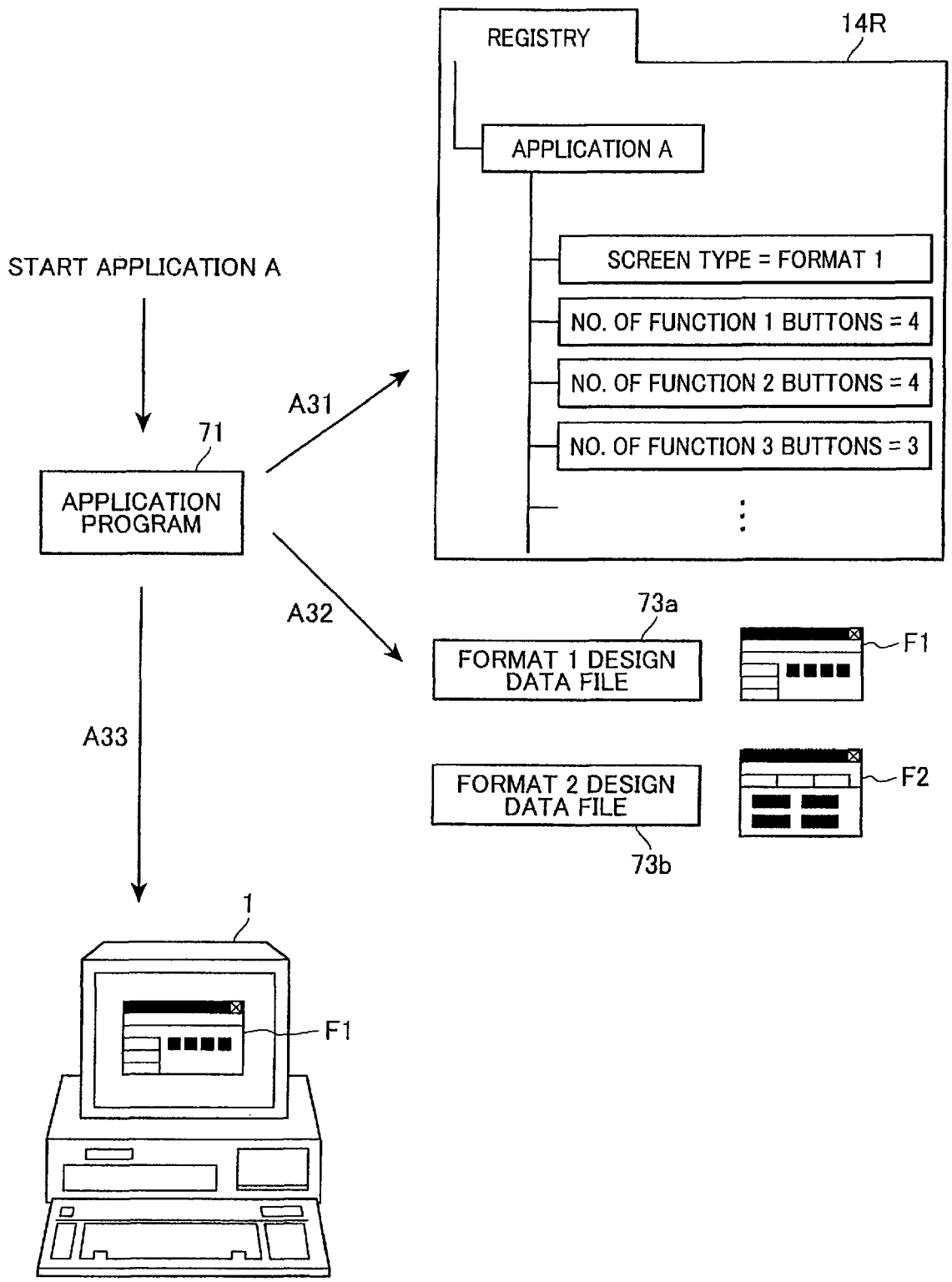
FIG. 19 is an explanatory diagram conceptually illustrating an example in which the process shown in FIG. 18 is executed.

FIG. 18 is a flowchart illustrating steps in an application startup process according to the fourth embodiment, whereby the application program 71 installed on the personal computer 1 sets the screen type upon startup and displays a window according to the set screen type. FIG. 19 is an explanatory diagram conceptually illustrating an example of executing the application startup process shown in FIG. 18. The personal computer 1 executes this process as a process of the application program 71 when the user performs a predetermined operation on the personal computer 1 to start the application A.

In S51 at the start of the application startup process in FIG. 18, the personal computer 1 (application program 71) first references the registry 14R and acquires settings data for the screen type from the settings data related to the application A. In S52 the personal computer 1 reads the design data file corresponding to the screen type specified by the settings data acquired in S51. In S53 the personal computer 1 displays a predetermined screen, such as a startup screen or a UI window, on the display unit 15 based on the design data file read in S52.

Next, an example of executing the above application startup process will be described based on FIG. 19. When the application A is started, the application program 71 references settings data recorded in the registry 14R for the screen type of the application A. The registry 14R includes data specifying the screen type as format 1 and data specifying the number of buttons functioning as the GUI in the format 1 screen that are recorded as settings data for the screen type (format 1). The application program 71 acquires the settings data for the screen type (format 1) from the registry 14R (arrow A31).

Next, the application program 71 reads the format 1 design data file 73a from among the design data files 73a and 73b corresponding to the various screen types based on the settings data for the screen type acquired above (format 1) as shown by arrow A32. Next, the application program 71 displays the UI window in the format 1 design F on the display unit 15 based on the data read from the format 1 design data file 73a (arrow A33).

On the other hand, if the screen type settings data recorded in the registry 14R were data specifying format 2 in the explanatory diagram of FIG. 19, then the application program 71 would read the format 2 design data file 73b and display the UI window in the format 2 design F2 on the display unit 15 of the personal computer 1.

<Installation Package According to Fifth Embodiment>

A storage medium storing an installation package according to a fifth embodiment will be described while referring to FIGS. 20 through 22.

The above-described fourth embodiment describes a case in which a single screen configuration data file 72 is provided in the installation package 70d. However, like the second embodiment described above, the fifth embodiment describes a case in which a plurality of the screen configuration data files 72a and 72b are provided in the installation package for a plurality of predetermined peripheral devices that the application A can control. In the fifth embodiment, the installation program drives the registry recording tool 75 to record settings data for the screen display type in the registry 14R based on one of the screen configuration data files 72a and 72b.

As in the second embodiment described above, the application A according to the fifth embodiment can control the plurality of peripheral devices connected to the personal computer 1 and has a function for controlling a peripheral device preset as the control target when installed on the personal computer 1. At this time, the application A displays a window according to the screen type preset for each peripheral device targeted for control. As in the second embodiment described above, the printer 2 and scanner 3 are assumed to be the two peripheral devices that the application A can control.

Figure 20:
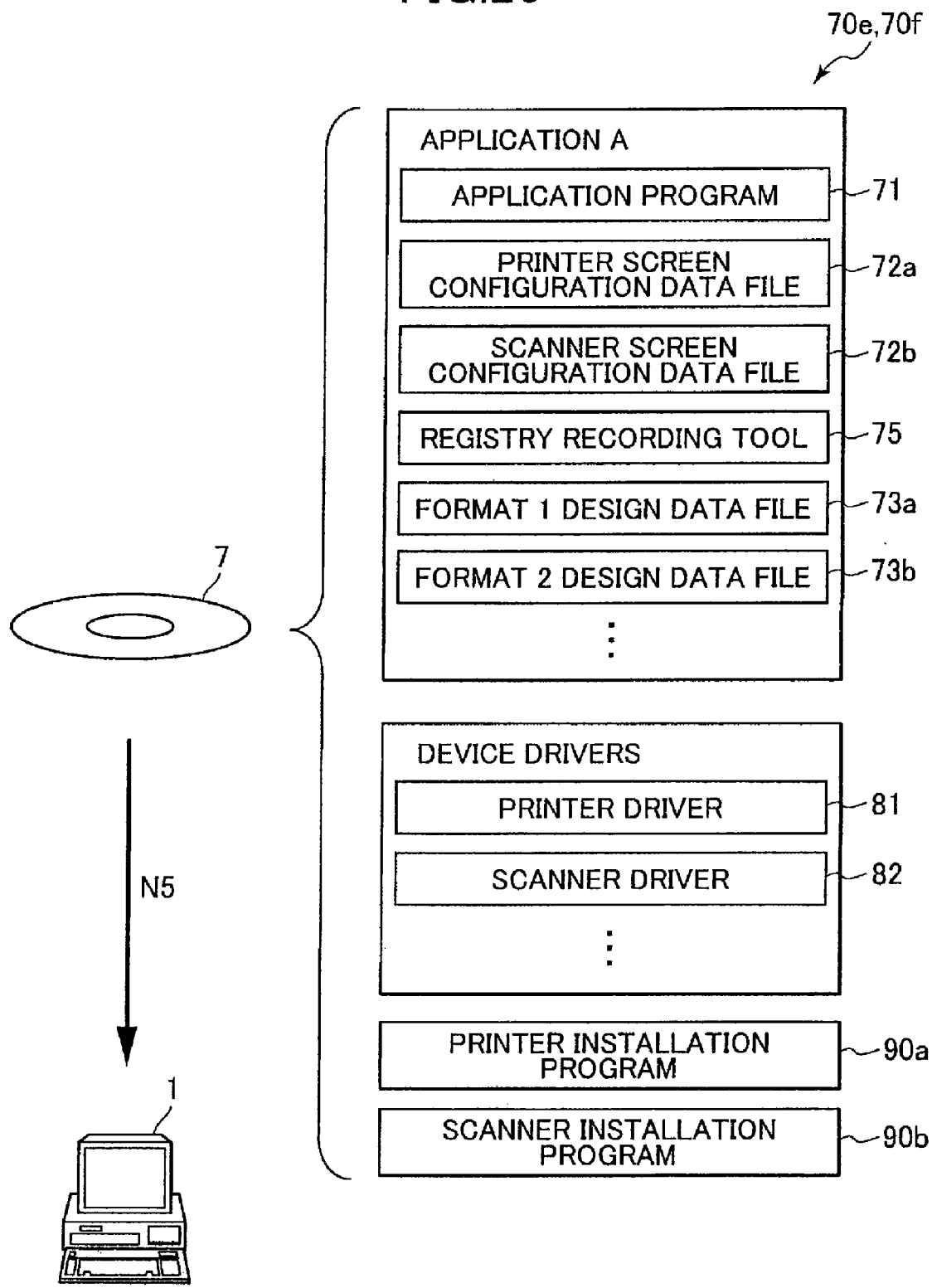
FIG. 20 is an explanatory diagram conceptually illustrating the overall structure of an installation package according to a fifth embodiment.

FIG. 20 is an explanatory diagram conceptually illustrating the overall structure of an installation package 70e according to the fifth embodiment. The installation package 70e according to the fifth embodiment primarily differs from the installation package 70d according to the fourth embodiment (see FIG. 14) in that the installation package 70e stores a plurality of the screen configuration data files 72a and 72b in place of the screen configuration data file 72 in the fourth embodiment and a plurality of the installation programs 90a and 90b corresponding to the installation program 90 in the fourth embodiment.

Since the screen configuration data files 72a and 72b have a structure identical to those data files in the installation package 70b according to the second embodiment, a description of these components will not be repeated.

As in the second embodiment described above, the installation program 90a or 90b installs the application A on the personal computer 1 as an application for controlling the printer 2 or scanner 3, respectively.

With the installation package 70e according to the fifth embodiment, the printer installation program 90a is started to install the application A when the user performs a predetermined operation on the personal computer 1 to issue a command to install the application A on the personal computer 1 as an application for controlling the printer 2. At this time, the printer installation program 90a drives the registry recording tool 75 to record settings data of the display type stored in the printer screen configuration data file 72a in the registry 14R according to the same procedure described in the registry recording process of the fourth embodiment (see FIG. 15).

On the other hands the scanner installation program 90b is started for installing the application A when the user issues an instruction to install the application A for controlling the scanner 3. In this case, the scanner installation program 90b drives the registry recording tool 75 to record settings data of the screen type stored in the scanner screen configuration data file 72b in the registry 14R according to the same procedure described above.

In this way, a device is selected and the installation program 90a or 90b for the selected device drives the registry recording tool 75 to record settings data of the display type for the selected device in the registry 14R (arrow N5). The installation program 90a or 90b also installs the application program 71, the format 1 design data file 73a, and the format 2 design data file 73b as described later.

Figure 21:
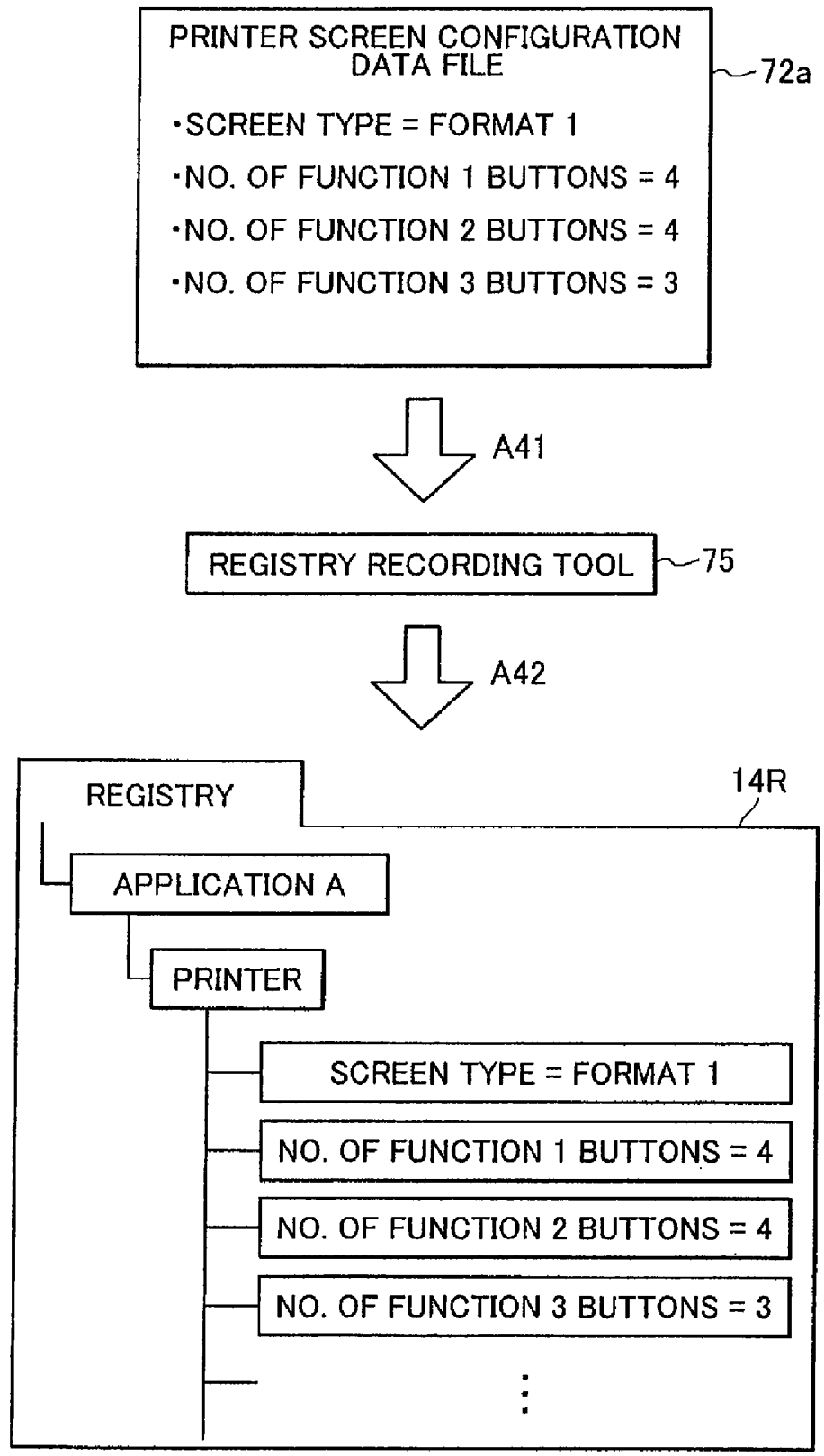
FIG. 21 is an explanatory diagram conceptually illustrating an example of the registry recording process executed according to the fifth embodiment.

FIG. 21 is an explanatory diagram conceptually illustrating an example of the registry recording process described above. This process is executed when the printer installation program 90a installs the application A.

When the printer installation program 90a drives the registry recording tool 75 in the installation process, as shown in FIG. 21, the registry recording tool 75 reads settings data of the screen type stored in the printer screen configuration data file 72a of the installation package 70e (arrow A41). In this example, the printer screen configuration data file 72a stores data specifying the screen type as format 1 and data specifying the number of buttons functioning as the GUI in a window of format 1 as the settings data for the screen type. The registry recording tool 75 records the settings data of this screen type read from the printer screen configuration data file 72a (format 1) in the registry 14R as settings data related to the application A (arrow A42).

Accordingly, the settings data recorded in the registry 14R when the application A functions to control the printer 2 includes data specifying the screen type of the format 1 and data specifying the number of buttons that function as the GUI in a format window.

Figure 22:
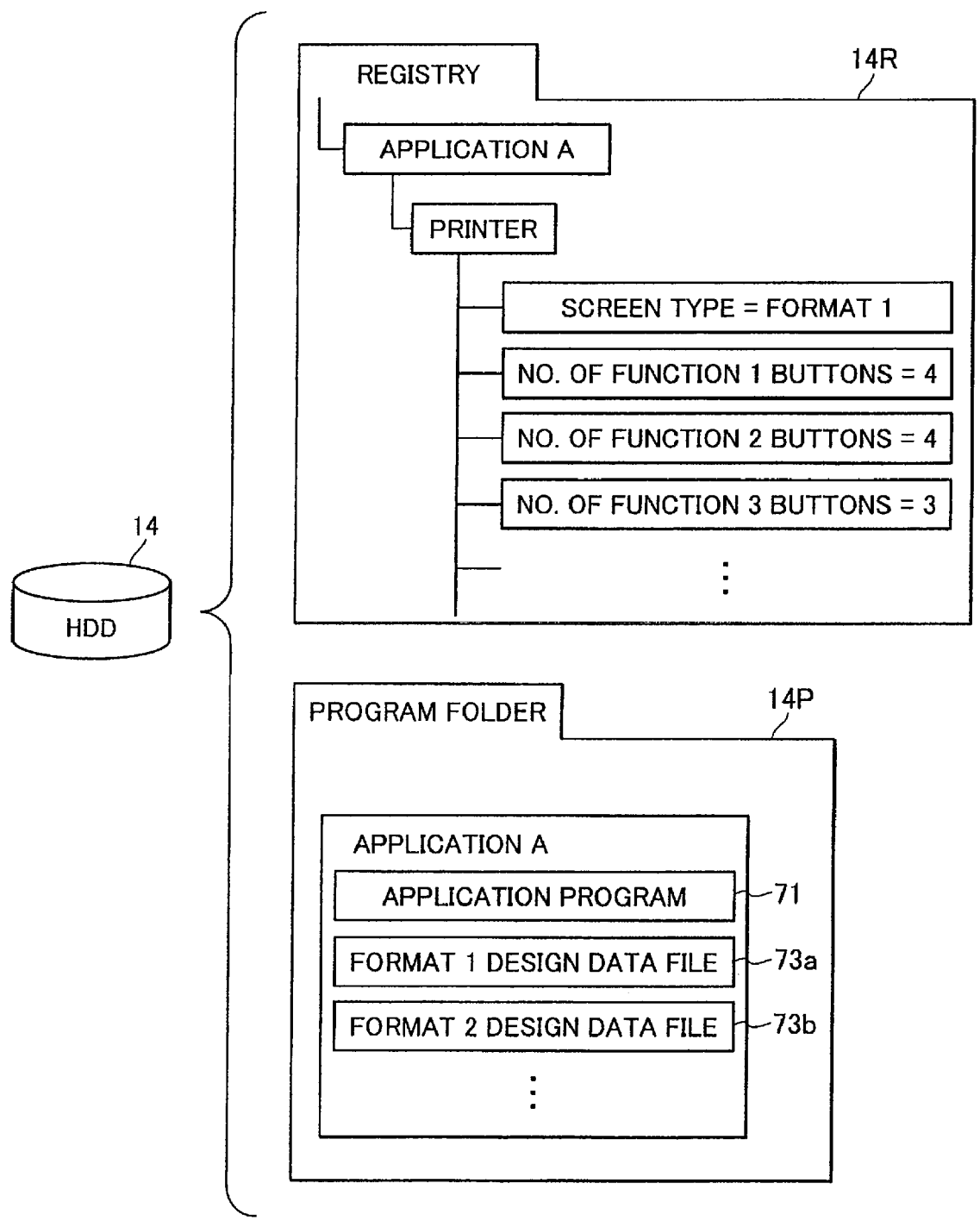
FIG. 22 is an explanatory diagram conceptually illustrating the configuration of settings data and files related to the application installed on the HDD of the personal computer in the fifth embodiment.

FIG. 22 shows the contents of the HDD 14 after the printer installation program 90a executes the registry recording process and installation process with the installation package 70e according to the fifth embodiment. More specifically, FIG. 22 shows the settings data and files related to the application A that have been installed in the registry 14R and program folder 14P of the HDD 14.

As shown in FIG. 22, settings data for the screen type is recorded in the registry 14P as settings data related to the application A when the printer installation program 90a drives the registry recording tool 75 as described above.

The printer installation program 90a also installs the application program 71, and the design data files 73a and 73b in the program folder 14P as files related to the application A.

With the installation package 70e according to the fifth embodiment, the application program 71 installed on the personal computer 1 sets the screen type upon startup and displays a window according to the set screen type (application startup process). Since this process is identical to that described in the fourth embodiment (see FIGS. 18 and 19), the process will not be repeated here.

<Installation Package According to Sixth Embodiment>

A storage medium storing an installation package according to a sixth embodiment will be described while referring to FIGS. 20 and 23 through 26.

In the fifth embodiment described above, the installation package includes a plurality of the screen configuration data files 72a and 72b corresponding to a plurality of predetermined peripheral devices that the application A can control, and the installation program drives the registry recording tool 75 to record settings data for the screen display type in the registry 14R provided in the HDD 14 of the personal computer 1 based on one of the screen configuration data files 72a and 72b.

In the sixth embodiment, settings data of the screen type stored for each of the plurality of screen configuration data files 72a and 72b corresponding to the plurality of predetermined peripheral devices is recorded in the registry 14R.

The application A according to the sixth embodiment is configured to control a plurality of peripheral devices connected to the personal computer 1. The application A has a function for acquiring data specifying the peripheral device targeted for control upon startup and for controlling the targeted peripheral device set based on the acquired data. At this time, the application A sets the screen type and displays a window based on the screen configuration data file corresponding to the targeted peripheral device. As in the fifth embodiment, the sixth embodiment assumes that the application A can control two peripheral devices, namely, the printer 2 and scanner 3.

FIG. 20 shows the overall structure of an installation package 70f according to the sixth embodiment. As shown in FIG. 20, the configuration of files in the installation package 70f is identical to that in the installation package 70e according to the fifth embodiment described above. However, the sixth embodiment differs from the fifth embodiment in the processes executed by the installation programs 90a and 90b, the registry recording tool 75, and the application program 71, such as the registry recording process and the application startup process described below.

As in the fifth embodiment, in the installation package 70f according to the sixth embodiment, the printer installation program 90a is started to install the application A when the user performs a predetermined operation on the personal computer 1 to input an instruction for installing the application A on the personal computer 1 as an application for controlling the printer 2 (arrow N5). At this time, the printer installation program 90a drives the registry recording tool 75 to start the registry recording process (printer mode). In this process, the registry recording tool 75 records data for starting the application A as an application to control the printer 2 (startup mode=printer mode), and settings data for the screen types stored in the screen configuration data files 72a and 72b in the installation package 70f in the registry 14R of the personal computer 1.

On the other hand, if the user inputs an instruction to install the application A as an application for controlling the scanner 3, then the scanner installation program 90b is started to install the application A as described in the fifth embodiment. At this time, the scanner installation program 90b drives the registry recording tool 75 to begin the registry recording process (scanner mode). This time, the registry recording tool 75 records data for starting the application A as an application to control the scanner 3 (startup mode=scanner mode), and settings data for the screen types stored in the screen configuration data files 72a and 72b in the installation package 70f in the registry 14R of the personal computer 1.

Figure 23:
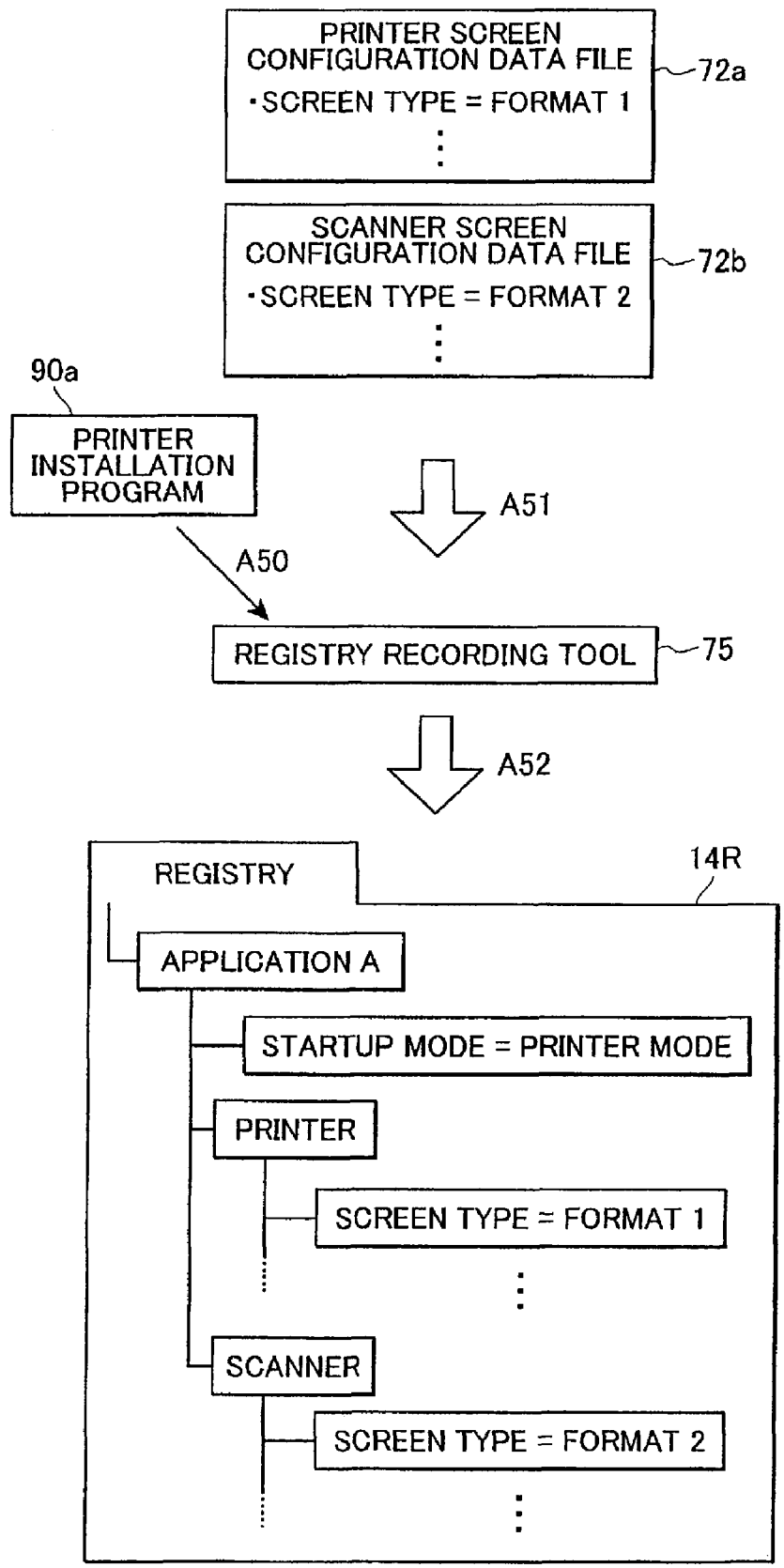
FIG. 23 is an explanatory diagram conceptually illustrating an example of the registry recording process executing according to a sixth embodiment.

FIG. 23 is an explanatory diagram conceptually illustrating an example of executing the registry recording process described above. In this example, the printer installation program 90a installs the application A.

When starting the registry recording tool 75 during the installation process, the printer installation program 90a transfers data indicating that the targeted peripheral device is the printer 2 as a parameter (arrow A50). Receiving this parameter from the printer installation program 90a, the registry recording tool 75 reads settings data for the screen types stored in both of the screen configuration data files 72a and 72b of the installation package 70f (arrow A51).

In this example, settings data in the screen configuration data files 72a and 72b specify the screen type as format 1 and format 2, respectively. The registry recording tool 75 records settings data for these screen types read from the screen configuration data files 72a and 72b in the registry 14R in association with the respective peripheral device name as settings data related to the application A (arrow A52).

The registry recording tool 75 also records data for starting the application A as an application to control the printer 2 in the registry 14R as settings data related to the application A based on the parameter transferred from the printer installation program 90a upon startup (arrow A52).

Figure 24:
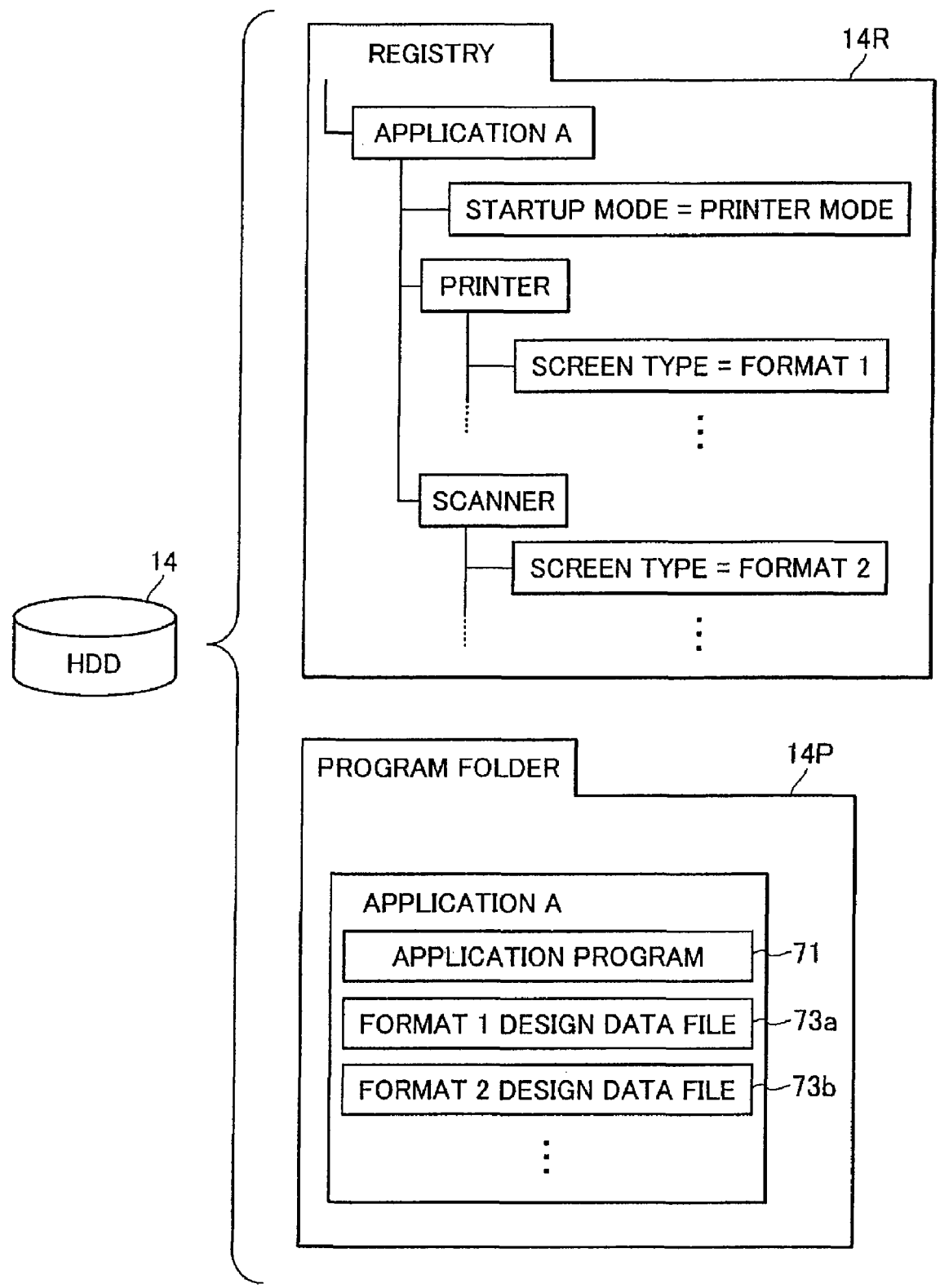
FIG. 24 is an explanatory diagram conceptually illustrating the configuration of settings data and files related to the application installed on the HDD of the personal computer in the sixth embodiment.

FIG. 24 shows the contents of the HDD 14 after the printer installation program 90a in the installation package 70f of the sixth embodiment executes the registry recording process and the installation process. More specifically, FIG. 24 shows the settings data and files related to the application A that have been recorded (installed) in the registry 14R and the program folder 14P of the HDD 14.

As shown in FIG. 24, the printer installation program 90a drives the registry recording tool 75 to record data specifying the startup mode of the application A (the printer mode in this case) and settings data for the screen types of each peripheral device that the application A can control in the registry 14R as settings data related to the application A.

The printer installation program 90a also installs the application program 71, and the design data files 73a and 73b in the program folder 14P as files related to the application A.

<Application Startup Process According to Sixth Embodiment>

Figure 25:
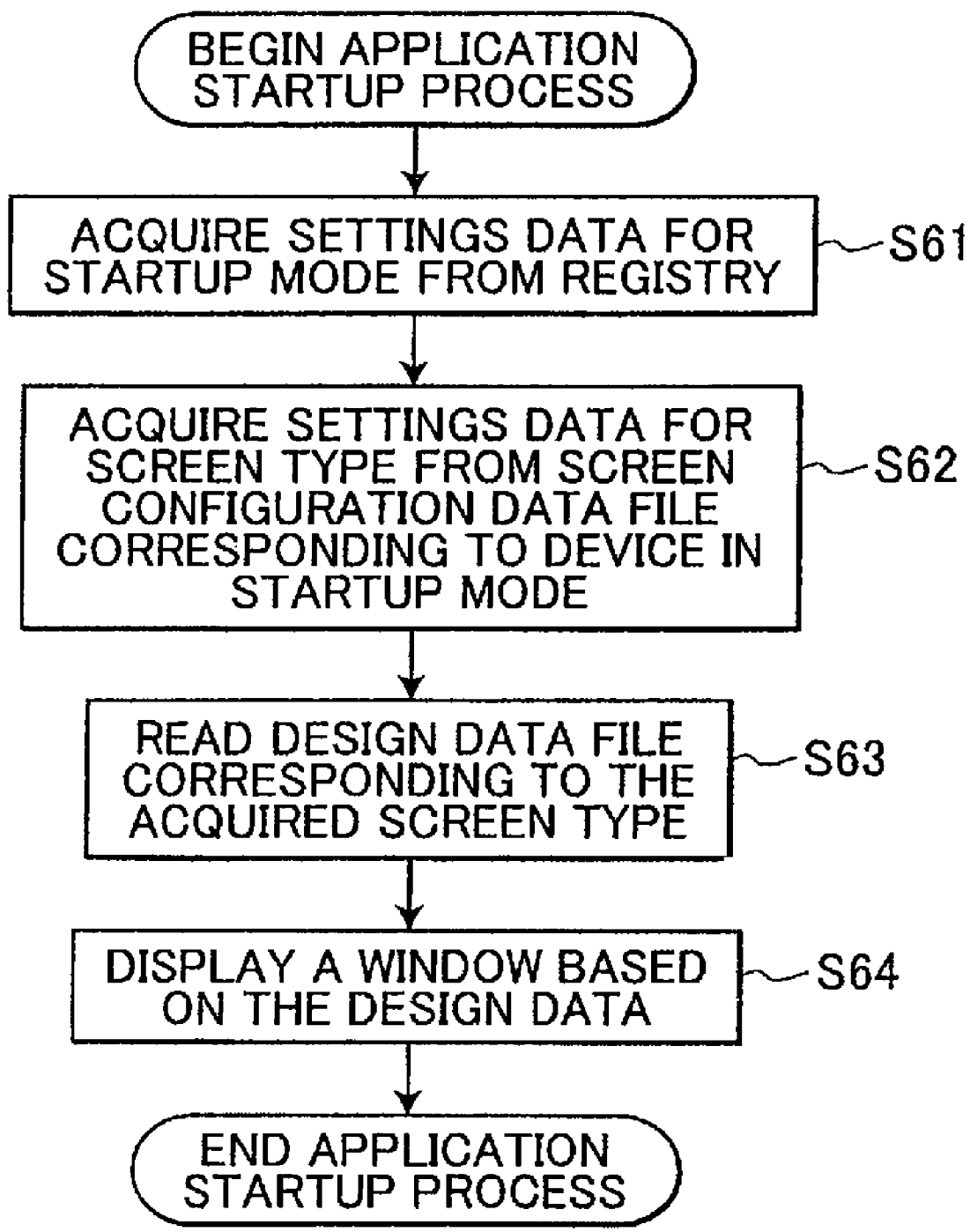
FIG. 25 is a flowchart illustrating steps in a process executed by the application program according to the sixth embodiment upon startup to set the screen type and display a window according to the set screen type.
Figure 26:
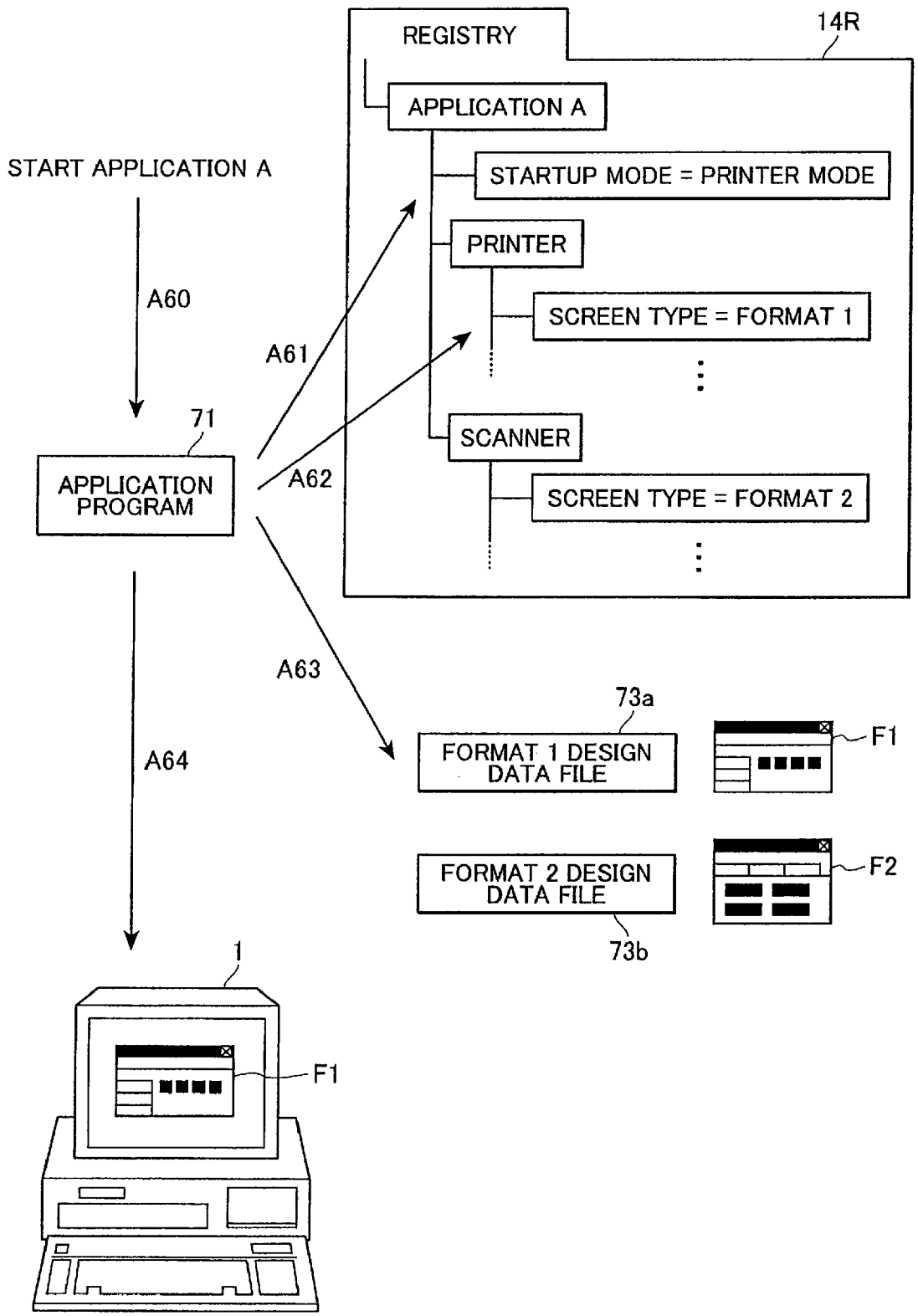
FIG. 26 is an explanatory diagram conceptually illustrating an example in which the process shown in FIG. 25 is executed.

FIG. 25 is a flowchart illustrating steps in the application startup process according to the sixth embodiment. In this process, the application program 71 installed on the personal computer 1 determines the screen type upon startup and displays a window in the set screen type. FIG. 26 is an explanatory diagram conceptually illustrating an example of the application startup process shown in the flowchart of FIG. 25. The personal computer 1 executes this process as the process of the application program 71 when the user performs a predetermined operation on the personal computer 1 to start the application A.

In S61 at the start of the application startup process shown in FIG. 25, the personal computer 1 (application program 71) acquires settings data for the startup mode from the registry 14R (printer mode or scanner mode). In S62 the personal computer 1 acquires settings data for the screen type from the registry 14R corresponding to the peripheral device of the startup mode specified by the settings data acquired in S61. In S63 the personal computer 1 reads a design data file corresponding to the screen type specified by the settings data acquired in S62. In S64 the personal computer 1 displays a predetermined window, such as a startup screen or UI window, on the display unit 15 based on the design data file read in S63.

Next, an example of the above application startup process will be described based on FIG. 26. When the application A is started (arrow A60), the application program 71 first references settings data for the startup mode recorded in the registry 14R (arrow A61). In this example, the settings data recorded in the registry 14R is data specifying the startup mode of the application A as the printer mode. The application program 71 acquires settings data for this startup mode (printer mode) from the registry 14R.

Next, the application program 71 references settings data for the screen type corresponding to the printer mode recorded in the registry 14R based on the settings data acquired above (arrow A62). The settings data for the screen type corresponding to the printer mode in the registry 14R includes data specifying the screen type as format 1 (identical to the content of the screen configuration data file 72 shown in FIG. 7). The application program 71 acquires settings data for the screen type format 1 from the registry 14R.

Next, the application program 71 reads the format 1 design data file 73a from among the plurality of design data files 73a and 73b based on the settings data for the screen type acquired above (format 1), as shown by arrow A63. Next, the application program 71 displays a UI window in the format 1 design F1 on the display unit 15 based on the data read from the format 1 design data file 73a (arrow A64).

On the other hand, if the settings data for the startup mode recorded in the registry 14R were data specifying the setup mode as the scanner mode in the explanatory diagram of FIG. 26, then the application program 71 would reference settings data of the screen type corresponding to the scanner mode recorded in the registry 14R and acquire settings data for the screen type (format 2). Next, the application program 71 would read the format 2 design data file 73b and display a UI window in the format 2 design F2 on the display unit 15.

As a modification of the sixth embodiment, it is conceivable to set the startup mode based on a parameter transferred from an external device when the application program 71 is started, rather than referencing settings data for the startup mode recorded in the registry 14R. In this case, the user could perform an operation on a control panel or the like on the targeted peripheral device to output a parameter from the peripheral device specifying the startup mode to the application program 71 of the personal computer 1, for example.

<First Modification>

A storage medium storing an installation package according to a first modification will be described while referring to FIGS. 27 and 28.

In the embodiments described above, the software provider includes a screen configuration data file in the installation package, and the screen type of the application program installed by the installation package is set according to the data stored in the screen configuration data file.

However, it is conceivable that usage environment of the personal computer 1 changes after the application A has been installed on the personal computer 1 according to the installation package of the above-described embodiments, for example. In such a case, the user may wish to modify the screen type of the personal computer 1 according to the change in the usage environment.

A method according to the first modification that addresses this problem will be described next. In this method, the application program 71 accepts a user operation on the personal computer 1 and modifies settings data for the screen type recorded on the personal computer 1.

Figure 27:
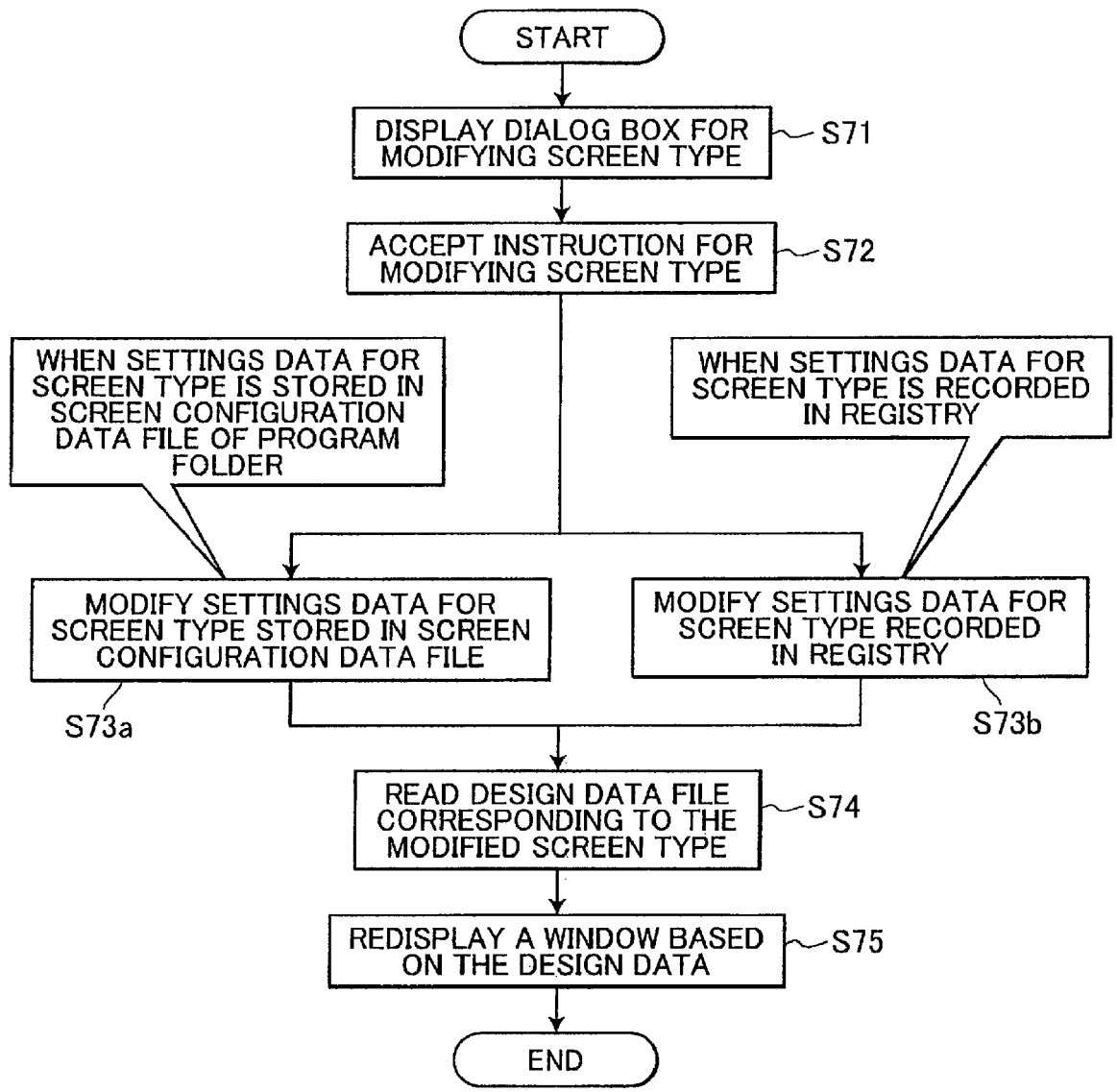
FIG. 27 is a flowchart illustrating steps in a screen type modification process executed by an application program according to a first modification.

FIG. 27 is a flowchart illustrating steps in a screen type modification process executed by the application program 71. FIG. 28 is an explanatory diagram conceptually illustrating sample windows displayed on the personal computer 1 according to a screen type modification process in the first modification. The personal computer 1 executes the screen type modification process as the process of the application program 71. The process is performed when the user performs a predetermined operation on the personal computer 1 while the application program 71 is running, indicating a desire to modify the screen type.

In S71 at the beginning of the screen type modification process in FIG. 27, the personal computer 1 displays a dialog box for modifying the screen type. More specifically, this example will assume that a UI window 101 (corresponding to format 1, for example) is displayed while the application program 71 is running, as illustrated in part (a) of FIG. 28. The UI window 101 includes a group of buttons 102, a group of tabs 103, and the like functioning as the GUI based on the format 1 design data file. If the user performs a predetermined operation indicating a desire to modify the screen type at this time, a popup dialog box 201 for modifying the screen type is displayed, as shown in part (b) of FIG. 28. The dialog box 201 includes radio buttons 202 for selecting a desired screen design. At this time, the radio button 202 next to "Design 1" (corresponding to format 1) is selected, indicating that the screen type is currently set to format 1.

Returning to the flowchart in FIG. 27, after displaying the dialog box for modifying the screen type in S71, in S72 the personal computer 1 receives instructions from the user for modifying the screen type. The following steps differ from the process in the embodiments described above.

When settings data for the screen type is included in the screen configuration data file stored in the program folder 14P, as in the first through third embodiments (see FIGS. 5, 9, and 11), then in S73a the personal computer 1 modifies the data for the screen type stored in the screen configuration data file based on a user instruction for modifying the screen type (modify screen type from format n to format m).

On the other hand, if settings data for the screen type is recorded in the registry 14R, as in the fourth through sixth embodiments (see FIGS. 17, 22, and 24), then in S73b the personal computer 1 modifies the data for the screen type recorded in the registry 14R based on a user instruction for modifying the screen type (modify screen type from format n to format m).

After modifying data for the screen type in S73a or S73b described above, in S74 the personal computer 1 reads the design data file corresponding to the modified screen type and in S75 redisplays the window based on the design data file read in S74.

Figure 28:
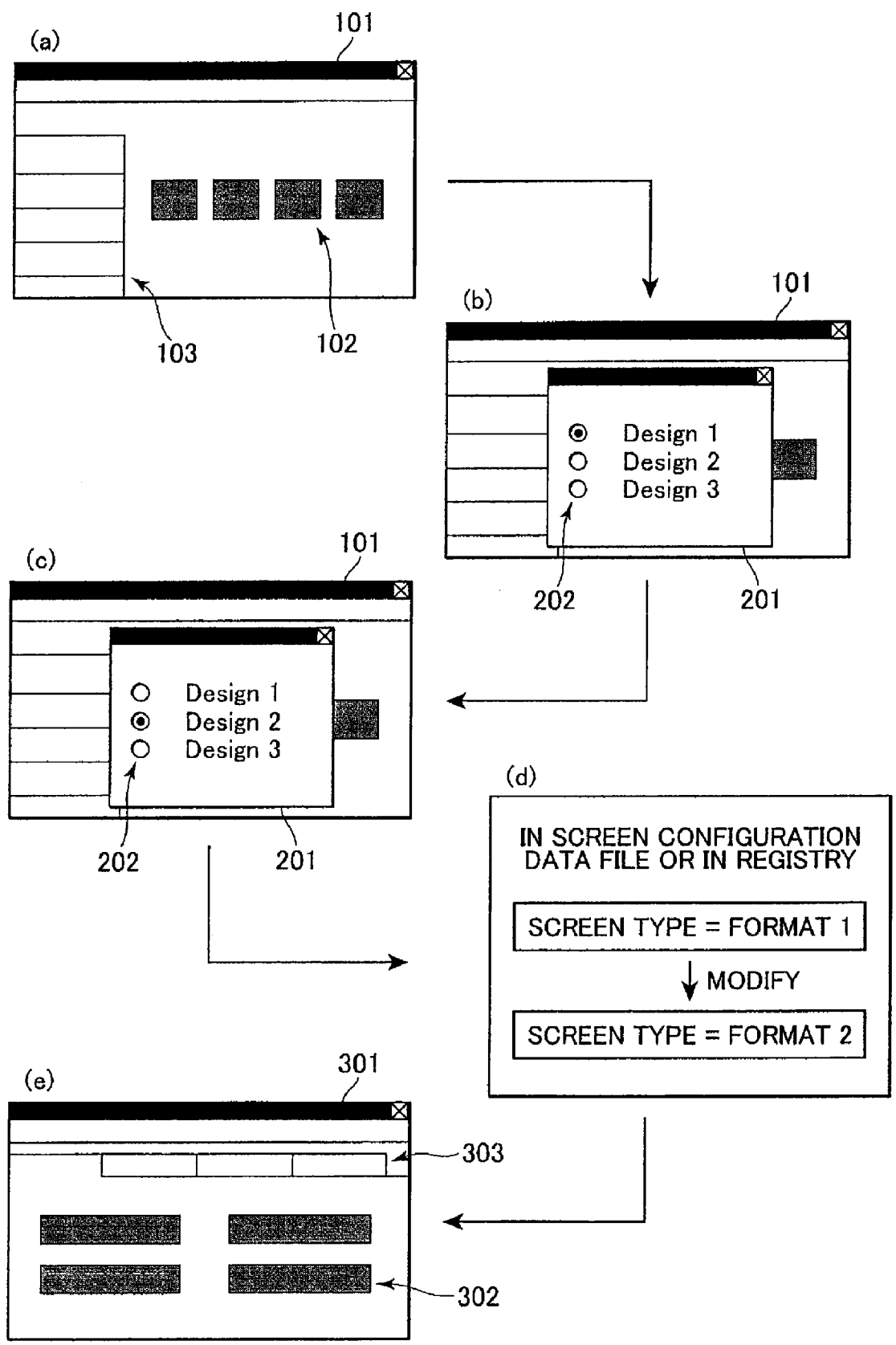
FIG. 28 is an explanatory diagram conceptually illustrating sample windows displayed on the personal computer according to the first modification, wherein part (a) shows a window in which a UI window corresponding to format 1 is displayed, part (b) shows a window in which a popup dialog box for modifying a screen type is displayed where "Design 1" corresponding to format 1 is selected, part (c) shows a window in which a user has selected "Design 2" corresponding to format 2 in the popup dialog box, part (d) illustrates conceptually that the personal computer modifies data indicating the screen type in the screen configuration data file or in the registry from "format 1" to "format 2", and part (e) shows a window in which a UI window corresponding to format 2 is displayed.

Specifically, when the user uses a mouse or other pointing device provided with the personal computer 1 to change the design selection from the radio button 202 next "Design 1" (corresponding to format 1) to the radio button 202 next to "Design 2" (corresponding to format 2) in the dialog box 201, as shown in parts (b) and (c) of FIG. 28, the personal computer 1 modifies data indicating the screen type in the screen configuration data file or the registry from "format 1" to "format 2," as illustrated in part (d) of FIG. 28.

Consequently, the personal computer 1 displays a UI window 301 corresponding to format 2, as shown in part (e) of FIG. 28. Here, the UI window 301 includes a group of buttons 302, a group of tabs 303, and the like functioning as the GUI based on the format 2 design data file.

<Second Modification>

Next, a second modification of the fifth and sixth embodiments will be described with reference to FIGS. 29 and 30. In the second modification, each of the screen configuration data files 72a and 72b stores both screen-type data specifying the screen type of the application A and a plurality of patterns of function data specifying the number of tabs and buttons (GUI elements) in the screen type as settings data. When performing the installation process according to the installation program 90a or 90b in this case, function data for one of the patterns is selectively recorded on the personal computer 1 based on the method in which the control target is connected to the personal computer 1. As with the installation packages 70e and 70f according to the fifth and sixth embodiments (see FIG. 20), the installation package according to the second modification includes a plurality of screen configuration data files corresponding to each of the predetermined peripheral devices that the application A can control, and the installation program drives the registry recording tool to record settings data of the screen type in the registry 14R provided in the HDD 14. Hence, refer to FIG. 20 and the like for the configuration of the installation package.

Figure 29:
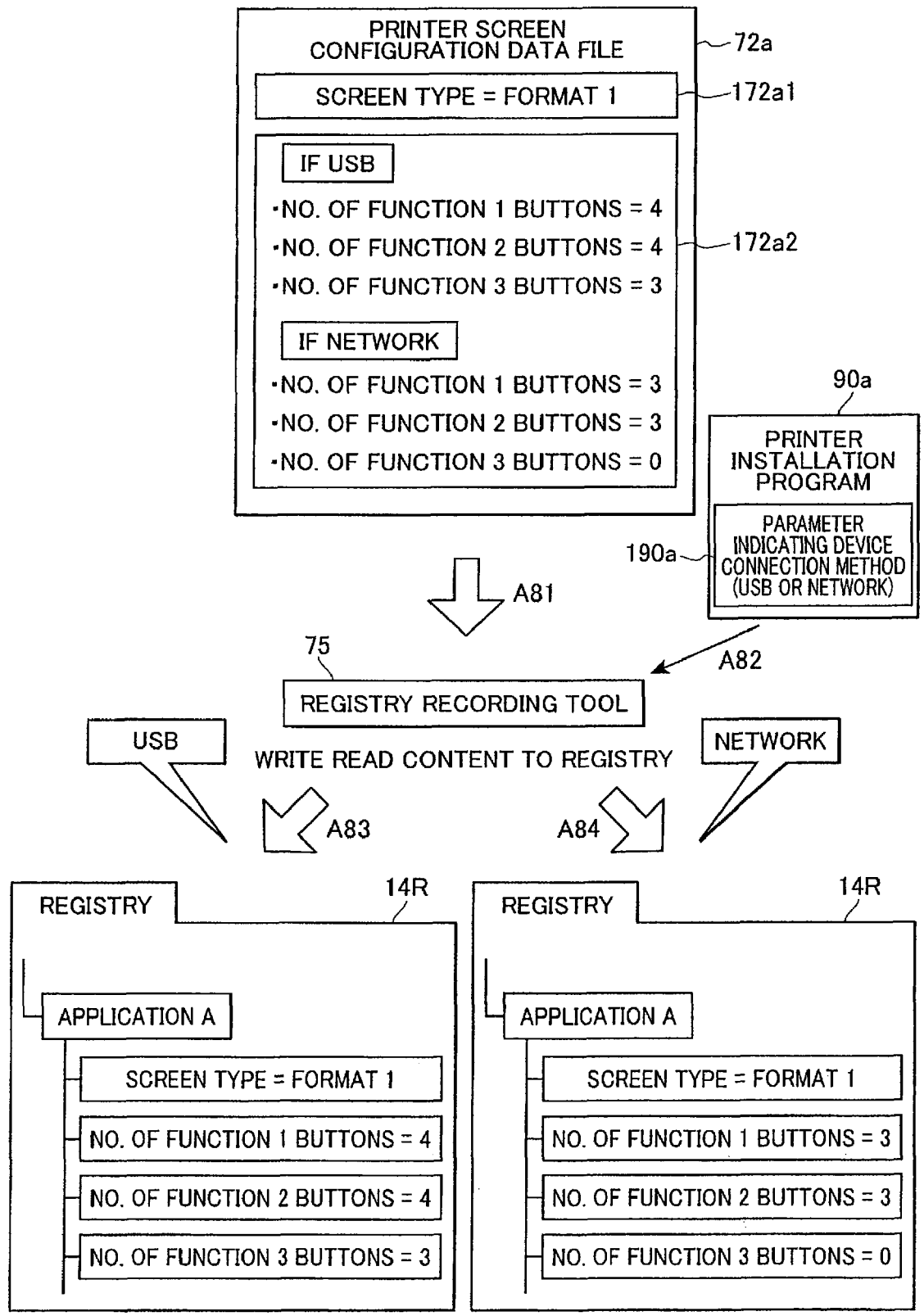
FIG. 29 is an explanatory diagram conceptually illustrating a procedure according to a second modification, in which the registry recording tool records settings data for the screen display type in the registry based on the printer screen configuration data file.

FIG. 29 is an explanatory diagram conceptually illustrating detailed content in the printer screen configuration data file 72a according to the second modification, and a procedure that the registry recording tool 75 executes based on the printer screen configuration data file 72a to record configuration data for the screen type in the registry 14R of the personal computer 1.

As shown in FIG. 29, the printer screen configuration data file 72a includes screen-type data 172a1 specifying the screen type as format 1, function data 172a2 specifying the number of tabs and buttons when the printer 2 is connected to the personal computer 1 by USB and specifying the number of tabs and buttons when the printer 2 is connected to the personal computer 1 by a network.

In the second modification, when executing the same registry recording process described in the fifth and sixth embodiments, the registry recording tool 75 reads the screen-type data 172a1 and the function data 172a2 in the printer screen configuration data file 72a (arrow A81) and also receives a parameter 190a from the printer installation program 90a indicating whether the connection method of the printer 2 is USB or network (arrow A82). Specifically, when executing the installation process, the printer installation program 90a displays a selection window on the display unit 15 of the personal computer 1 (see part (a) of FIG. 30) prompting the user to select a connection method for the targeted printer 2, and acquires data for the connection method (USB or network) by receiving an instruction from the user. The printer installation program 90a then passes this acquired data to the registry recording tool 75 as a parameter.

The registry recording tool 75 determines the connection method for the printer 2 based on the parameter received from the printer installation program 90a. If the connection method is a USB connection, then the registry recording tool 75 records function data corresponding to the USB connection from function data for a plurality of patterns stored in the printer screen configuration data file 72a together with data specifying the screen type as format 1 in the registry 14R as settings data related to the application A (arrow A83). However, if the connection method is a network connection, then the registry recording tool 75 records function data corresponding to a network connection together with data specifying the screen type as format 1 in the registry 14R as settings data related to the application A (arrow A84).

FIG. 30 is an explanatory diagram showing an example screen display on the personal computer 1 when the printer installation program 90a according to the second modification executes the installation process, and a sample screen display on the personal computer 1 when the installed application A is started.

After starting the installation process, the printer installation program 90a displays a UT window 401, such as that shown in part (a) of FIG. 30, and prompts the user to specify a connection method for the targeted printer 2.

When the user clicks on either a button 402 specifying the USB connection or a button 403 specifying a network connection in the UT window 401, the printer installation program 90a transfers data related to the connection method of the printer 2 based on the inputted instruction to the registry recording tool 75 as a parameter and begins to install the application A. During installation, a UT window 501 showing the installation progress is displayed as shown in part (b) of FIG. 30.

After the application A has been installed on the personal computer 1 and the application A is started as shown in part (c) of FIG. 30, one of UT windows 601a and 601b is displayed on the display unit 15 as shown in parts (d) and (e) of FIG. 30, based on the connection method for the printer 2 that the user specified before installation. The UT windows 601a and 601b differ according to the number of buttons 602 and tabs 603 that function as the GUT.

<Effects>

The installation package according to the above-described embodiments has the following effects.

In the installation package according to the first and fourth embodiments, the software provider stores settings data for the screen type corresponding to the end-user of the application A in the screen configuration data file 72, and the screen configuration data file 72 is included in the installation package. Hence, when installed on the personal computer 1, the application program 71 determines the screen type based on settings data for the screen type stored in the screen configuration data file 72 installed on the personal computer 1 (in the case of the first embodiment) or recorded in the registry 14R (in the case of the fourth embodiment) from a plurality of display formats. Hence, the application program 71 can display windows, such as a startup screen or UI window, of a screen type suited to the selected end-user.

In other words, the software provider simply prepares a single application program 71 and design data files 73a and 73b for each screen type corresponding to each targeted end-user in an installation package, and adds settings data for the screen type in the screen configuration data file 72 that differs depending on the end-user. In this way, the software provider can provide an application A that is suited to each end-user.

In this way, the software provider need only develop a single application program, but can supply what appears to be a plurality of models of the application program, thereby greatly reducing the cost and effort required to develop, test, and revise application programs compared to the method of creating a plurality of application programs for each end-user.

Further, as described in the second, third, fifth, and sixth embodiments, the software package can install the application program 71 for displaying windows in a screen type suited to the end-user, even when a plurality of end-users is envisioned for each peripheral device (printer 2, scanner 3, etc.) that the application program 71 can control, simply by preparing an installation package including a single application program 71 and the design data files 73a and 73b for each screen type corresponding to the envisioned end-users and including settings data of the screen type in the screen configuration data files 72a and 72b that differs depending on the end-user of each device. In this way, the software provider can simply develop a single application program serving as separate application programs corresponding to each end user and each of a plurality of devices that the application program can control.

Further, with the installation package according to the first modification, the user can modify the screen type set when the application A was installed, thereby providing a more user-friendly application program.

With the installation package according to the second modification, a plurality of function data (function data 172a2) is stored in a single printer screen configuration data file 72a so that a UI window suited to the network environment can be displayed with a single screen-type data 172a1 included in the printer screen configuration data file 72a. Specifically, the number of buttons that function as the GUI in the screen type can be modified based on the connection method for the targeted peripheral device (printer 2, scanner 3, etc.).

While the invention has been described in detail with reference to the above aspects thereof, it would be apparent to those skilled in the art that various changes and modifications may be made therein without departing from the spirit of the invention.

What is claimed is:

1. A storage medium storing an installation package for installing an application program on a computer, the installation package comprising:

an application program that is configured to display a screen in a display format when the application program is installed on a computer;

a plurality of screen display data files each including screen-display data for displaying a screen in a corresponding one of a plurality of display formats;

a screen configuration data file that includes display-format data specifying one of the plurality of display formats; and an installer that installs on the computer the application program, the plurality of screen display data files, and the screen configuration data file, wherein the application program determines the display format based on the screen configuration data file when the application program is started on the computer, and displays the screen in the display format by using one of the plurality of screen display data files that corresponds to the display format specified by the screen configuration data file.

2. The storage medium according to claim 1, wherein the application program is capable of controlling a plurality of devices;

wherein the application program is configured to control a device that is selected as a control target from among the plurality of devices when the application program is installed on the computer;

wherein the screen configuration data file includes a plurality of screen configuration data files that are provided for respective ones of the plurality of devices; and wherein the installer sets one of the plurality of devices as the control target based on a predetermined instruction, and installs on the computer the plurality of screen display data files and one of the plurality of screen configuration data files corresponding to the device selected as the control target.

3. The storage medium according to claim 1, wherein the application program is capable of controlling a plurality of devices;

wherein the application program is configured to acquire device-specifying data specifying a device as a control target from among the plurality of devices when the computer is started and to control the device specified as the control target based on the device-specifying data;

wherein the screen configuration data file includes a plurality of screen configuration data files that are provided for respective ones of the plurality of devices;

wherein the installer installs on the computer the application program, the plurality of screen display data files, and the plurality of screen configuration data files; and wherein the application program determines the display format based on one of the plurality of screen configuration data files corresponding to the device specified as the control target.

4. The storage medium according to claim 3, wherein the device-specifying data includes a parameter that is transferred from one of the plurality of devices when a user performs a predetermined operation on the one of the plurality of devices.

5. The storage medium according to claim 1, wherein the application program is configured to modify, based on an instruction from a user, the screen configuration data file installed on the computer, thereby modifying the display format.

6. A storage medium storing an installation package for installing an application program on a computer, the installation package comprising:

an application program that is configured to display a screen in a display format when the application program is installed on a computer;

a plurality of screen display data files each including screen-display data for displaying a screen in a corresponding one of a plurality of display formats;

a screen configuration data file that includes display-format data specifying one of the plurality of display formats; a settings recording tool that records the display-format data in a settings database managed by an operating system of the computer; and an installer that installs on the computer the application program and the plurality of screen display data files and that uses the settings recording tool to record the display-format data in the settings database, wherein the application program determines the display format based on the display-format data recorded in the settings database when the application program is started on the computer, and displays the screen in the display format by using one of the plurality of screen display data files that corresponds to the display format specified by the display-format data.

7. The storage medium according to claim 6, wherein the application program is capable of controlling a plurality of devices;

wherein the application program is configured to control a device that is selected as a control target from among the plurality of devices when the application program is installed on the computer;

wherein the screen configuration data file includes a plurality of screen configuration data files that are provided for respective ones of the plurality of devices; and wherein the installer sets one of the plurality of devices as the control target based on a predetermined instruction, and uses the settings recording tool to record the display-format data in the settings database based on one of the plurality of screen configuration data files corresponding to the device selected as the control target.

8. The storage medium according to claim 7, wherein each of the plurality of screen configuration data files stores both screen-type data specifying a screen type and a plurality of patterns of function data specifying a number of graphical-user-interface elements; and wherein the settings recording tool selectively records the function data for one of the plurality of patterns in the settings database, depending on a method in which the device selected as the control target is connected to the computer.

9. The storage medium according to claim 6, wherein the application program is capable of controlling a plurality of devices;

wherein the application program is configured to acquire device-specifying data specifying a device as a control target from among the plurality of devices when the computer is started and to control the device specified as the control target based on the device-specifying data;

wherein the screen configuration data file includes a plurality of screen configuration data files that are provided for respective ones of the plurality of devices, each of the plurality of screen configuration data files having the display-format data;

wherein the installer uses the settings recording tool to record, in the settings database, the display-format data in each of the plurality of screen configuration data files when the installer installs on the computer the application program and the plurality of screen display data files; and wherein the application program determines the display format based on the display-format data corresponding to the device specified as the control target.

10. The storage medium according to claim 9, wherein the device-specifying data includes a parameter that is transferred from one of the plurality of devices when a user performs a predetermined operation on the one of the plurality of devices.

11. The storage medium according to claim 6, wherein the application program is configured to modify, based on an instruction from a user, the display-format data recorded in the settings database, thereby modifying the display format.

* * * * *